United States Patent
Wang et al.

(10) Patent No.: US 12,386,095 B2
(45) Date of Patent: Aug. 12, 2025

(54) DETERMINING FORMATION CONDUCTIVITY WITH PROPAGATION MEASUREMENTS

(71) Applicant: Schlumberger Technology Corporation, Sugar Land, TX (US)

(72) Inventors: Gong Li Wang, Sugar Land, TX (US); Dean Homan, Damon, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 379 days.

(21) Appl. No.: 17/995,209

(22) PCT Filed: Mar. 30, 2021

(86) PCT No.: PCT/US2021/024949
§ 371 (c)(1),
(2) Date: Sep. 30, 2022

(87) PCT Pub. No.: WO2021/202572
PCT Pub. Date: Oct. 7, 2021

(65) Prior Publication Data
US 2023/0184987 A1  Jun. 15, 2023

Related U.S. Application Data

(60) Provisional application No. 63/002,945, filed on Mar. 31, 2020.

(51) Int. Cl.
*G01V 3/38* (2006.01)
*E21B 49/00* (2006.01)
*G01V 3/28* (2006.01)

(52) U.S. Cl.
CPC ............... *G01V 3/38* (2013.01); *E21B 49/00* (2013.01); *G01V 3/28* (2013.01)

(58) Field of Classification Search
CPC ... G01V 3/38; G01V 3/28; G01V 3/30; G01V 3/34; E21B 49/00
See application file for complete search history.

(56) References Cited

U.S. PATENT DOCUMENTS 3,891,916 A   6/1975  Meador et al.
4,899,112 A   2/1990  Clark et al.
(Continued)

FOREIGN PATENT DOCUMENTS

WO   2008021868 A2   2/2008

OTHER PUBLICATIONS

Substantive Exam issued in Saudi Arabia Patent Application No. 522440760 dated Sep. 27, 2023, 17 pages.
(Continued)

*Primary Examiner* — Manuel A Rivera Vargas
(74) *Attorney, Agent, or Firm* — Jeffrey D. Frantz

(57) ABSTRACT

Properties of a geological formation, such as dielectric constant and conductivity, may be determined by a propagation well log data acquired by a propagation well logging tool based at least in part on a relative longitudinal position of two or more receivers of the propagation well logging tool. In some embodiments, the relative longitudinal position of the at least two receivers is based at least in part on a first distance between a first receiver of the at least two receivers and a transmitter of the propagation well logging tool and a second distance between a second receiver of the at least two receivers and the transmitter.

18 Claims, 17 Drawing Sheets

(56) References Cited

U.S. PATENT DOCUMENTS

| | | | |
|---|---|---|---|
| 5,341,100 | A | 8/1994 | Taylor |
| 7,327,145 | B2 | 2/2008 | Haugland |
| 7,414,391 | B2 | 8/2008 | Homan et al. |
| 7,536,261 | B2 | 5/2009 | Omeragic et al. |
| 7,656,160 | B2 | 2/2010 | Legendre et al. |
| 7,755,361 | B2 | 7/2010 | Seydoux et al. |
| 8,193,813 | B2 | 6/2012 | Seydoux et al. |
| 8,466,683 | B2 | 6/2013 | Legendre et al. |
| 8,736,270 | B2 | 5/2014 | Seydoux et al. |
| 9,134,449 | B2 | 9/2015 | Seydoux et al. |
| 9,835,753 | B2 | 12/2017 | Frey et al. |
| 9,835,755 | B2 | 12/2017 | Frey et al. |
| 10,371,852 | B2 | 8/2019 | Homan et al. |
| 2005/0006090 | A1 | 1/2005 | Chemali et al. |
| 2011/0227577 | A1 | 9/2011 | Zhang et al. |
| 2015/0276966 | A1* | 10/2015 | Wang ..................... G01V 3/38 702/7 |

OTHER PUBLICATIONS

International Search Report and Written Opinion issued in the PCT Application PCT/US2021/024949, dated Jul. 6, 2021 (11 pages).
International Preliminary Report on Patentability issued in the PCT Application PCT/US2021/024949 dated Oct. 13, 2022, 7 pages.

\* cited by examiner

DETERMINING FORMATION CONDUCTIVITY WITH PROPAGATION MEASUREMENTS

CROSS-REFERENCE TO RELATED APPLICATION

The present document is a National Stage Entry of International Application No. PCT/US2021/024949, filed on Mar. 30, 2021, which is based on and claims priority to U.S. Provisional Application Ser. No. 63/002,945, filed Mar. 31, 2020, which is incorporated herein by reference in its entirety.

BACKGROUND

This disclosure relates to identifying properties of a geological formation using a downhole electromagnetic measurement. More specifically, this disclosure relates to techniques for determining a formation conductivity from propagation measurements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from well logging tools (e.g., downhole well logging tools) that are conveyed deep into the wellbore. The measurements may be used to infer properties or characteristics of the geological formation surrounding the wellbore. One example of such downhole well logging tools are propagation well logging tools. However, conventional processing methods for handling the measurements may lead to relatively high processing times as well as memory requirements for storing the processed measurements.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method. The method includes acquiring, via a processor, propagation measurements in a wellbore through a geological formation using one or more propagation downhole well logging tools having at least two receivers. The method also includes converting, via the processor, the propagation measurements to two apparent conductivities based at least in part on a frequency associated with the propagation measurements, a relative longitudinal position of the at least two receivers, and a phase shift measurement and an attenuation measurement.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
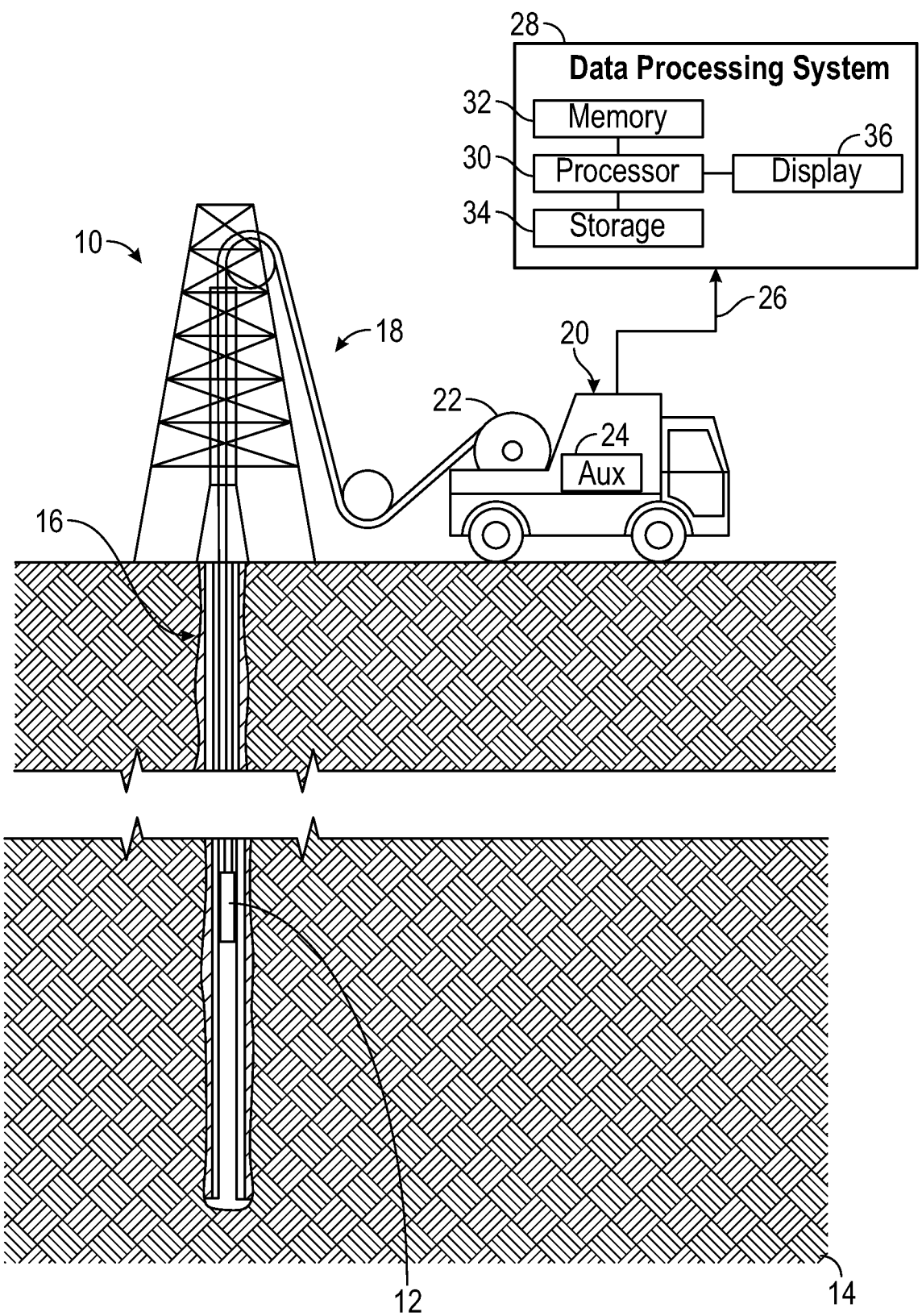
FIG. 1 is a schematic diagram of a well logging system that may acquire electromagnetic (EM) measurements, such as propagation measurements, in accordance with aspects of the present disclosure.

One or more specific embodiments of the present disclosure will be described below. These described embodiments are examples of the presently disclosed techniques. Additionally, in an effort to provide a concise description of these embodiments, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the present context, the term "about" or "approximately" is intended to mean that the values indicated are not exact and the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

As mentioned above, oil and gas exploration organizations may make certain oil and gas production decisions, such as determining where to drill, based at least in part on well log data. More specifically, a well logging tool acquires well logging measurements, which may be processed (e.g., normalized, de-noised, provided as inputs to a model, etc.) by a suitable computing device to generate the well log data. As referred to herein, "well log data" is a measurement or a property derived from measurements versus depth or time, or both, of one or more properties (e.g., resistivity, conductivity, dip and azimuth, and the like) in or around a wellbore, and thus, may be used to identify a location within the wellbore that corresponds to an area of interest (e.g., hydrocarbons, an organic deposit, a "bed" or layer of sedimentary rock, or stratum, and the like). At least in some instances, the well log data may be transformed into one or more visual representations (e.g., a well log) that are presented as hard copies or on an electronic display, where each visual representation of the one or more visual representations may depict the well log data resulting from the well logging measurements.

One type of well logging measurement that may be used to inform the oil and gas production decisions are propagation well logging measurements. In general, propagation well logging measurements may be acquired using one or more propagation well logging tools that each include a number of transmitter coils and receiver coils. As should be understood by one of ordinary skill in the art, a propagation well logging tool may operate at a frequency (e.g., approximately 100 kHz, 200 kHz, 300 kHz, 400 kHz, 1000 kHz, 2000 kHz, and the like), which may facilitate the determination of certain properties of a geological formation, such as the resistivity and dielectric properties. It should be noted that measuring the resistivity and dielectric properties may enable differentiation between certain components that are present within the geological formation such as water, oil, and gas. However, while the ability to measure at these frequencies may be advantageous for differentiating between these components (e.g., water and oil) based at least in part on the resistivity and dielectric properties, propagation well logging measurements at these frequencies (e.g., measured by a receiver of the propagation well logging tool) may be adversely affected due to the skin effect.

Conventional propagation well logging tools may process the phase shift and attenuated propagation measurements using an inversion in order to generate conductivity and/or resistivity well logs. Existing processes for inverting the measurements (e.g., the phase shift and attenuate measurements) may be computationally expensive (e.g., having high memory usage), and thus take a relatively large amount of time to process the measurements to generate the well logs, which are used for informing oil and gas productive decisions.

Accordingly, the present disclosure relates to techniques for processing propagation well logging measurements to generate an apparent conductivity and/or apparent resistivity based at least in part on the propagation well logging measurements without using an inversion or a resistivity transform. In particular, the disclosed techniques for processing the propagation well logging measurements may utilize a tool constant that is based on a relative longitudinal position of at least two of the receivers of the propagation well logging tool. The disclosed tool constant and the apparent conductivity and/or the apparent resistivity may be used to generate apparent conductivity and/or apparent resistivity well logs. In some embodiments, the apparent conductivity may be a phase shift apparent conductivity and/or an attenuation apparent conductivity. As discussed in further detail with regard to FIGS. 3 and 4, the phase shift apparent conductivity may provide a measure of formation conductivity and the attenuation apparent conductivity may provide a measure of the skin effect. In some embodiments, the phase shift apparent conductivity may be corrected for the skin effect using the attenuation apparent conductivity to generate an improved apparent conductivity that may be representative of the true formation conductivity.

With this in mind, FIG. 1 illustrates a well logging system 10 that may employ the systems and methods of this disclosure. The well logging system 10 may be used to convey a propagation well logging tool 12 through a geological formation 14 via a wellbore 16. The propagation well logging tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the propagation well logging tool 12.

Moreover, although the propagation well logging tool 12 is described as being a wireline downhole tool, it should be appreciated that any suitable conveyance may be used. For example, the propagation well logging tool 12 may instead be conveyed as a logging-while-drilling (LWD) downhole tool as part of a bottom hole assembly (BHA) of a drill string, conveyed on a slickline or via coiled tubing, and so forth. For the purposes of this disclosure, the propagation well logging tool 12 may be any suitable measurement downhole tool that acquires propagation logging measurements through depths of the wellbore 16.

Many types of propagation well logging tools 12 may acquire propagation well logging measurements in the wellbore 16. These include, for example, a compensated dual resistivity (CDR) downhole tool, an array resistivity compensated (ARC) downhole tool, PERISCOPE, and the like. The propagation well logging tool 12 may provide propagation logging measurements 26 to a data processing system 28 via any suitable telemetry (e.g., via electrical signals pulsed through the geological formation 14 or via mud pulse telemetry). The data processing system 28 may process the propagation logging measurements 26 to identify a horizontal conductivity and/or horizontal resistivity, a vertical conductivity and/or vertical resistivity, a dip and an azimuth at various depths of the geological formation 14 in the wellbore 16.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the propagation logging measurements 26.

Figure 2:
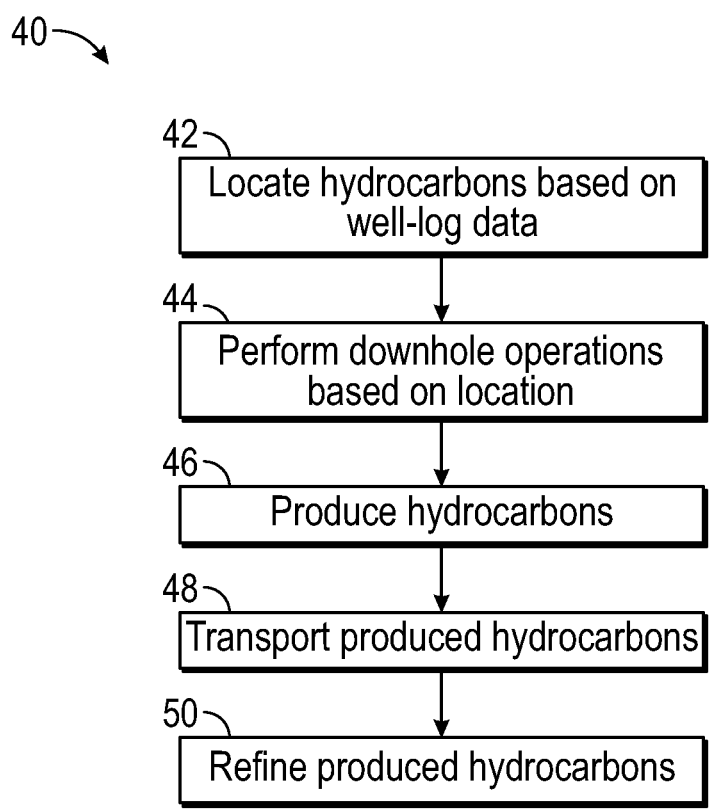
FIG. 2 illustrates a flow chart of various processes that may be performed based at least in part on analysis of EM well log data, in accordance with aspects of the present disclosure.

FIG. 2 illustrates a method 40 of various processes that may be performed based at least in part on analysis of well logs, in accordance with aspects of the present disclosure. A location of hydrocarbon deposits within a geological formation may be identified (process block 42) based at least in part on well log measurements. In some embodiments, the well log measurements may be analyzed to generate a map or profile that illustrates regions of interest with the geological formation.

Based on the identified locations and properties of the hydrocarbon deposits, certain downhole operations on positions or parts of the geological formation 14 may be performed (process block 44). That is, hydrocarbon exploration organizations may use the locations of the hydrocarbon deposits to determine locations in the wellbore to isolate for extracting liquid, frack, and/or drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 14, the hydrocarbons that are stored in the hydrocarbon deposits may be produced (block 46) via natural flowing wells, artificial lift wells, and the like. Further, the produced hydrocarbons may be transported (block 48) to refineries and the like via transport vehicles, pipelines, and the like. Further still, the produced hydrocarbons may be processed (block 50) according to various refining procedures to develop different products using the hydrocarbons.

It should be noted that the processes discussed with regard to the method 40 may include other suitable processes that may be based at least in part on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

Figure 3:
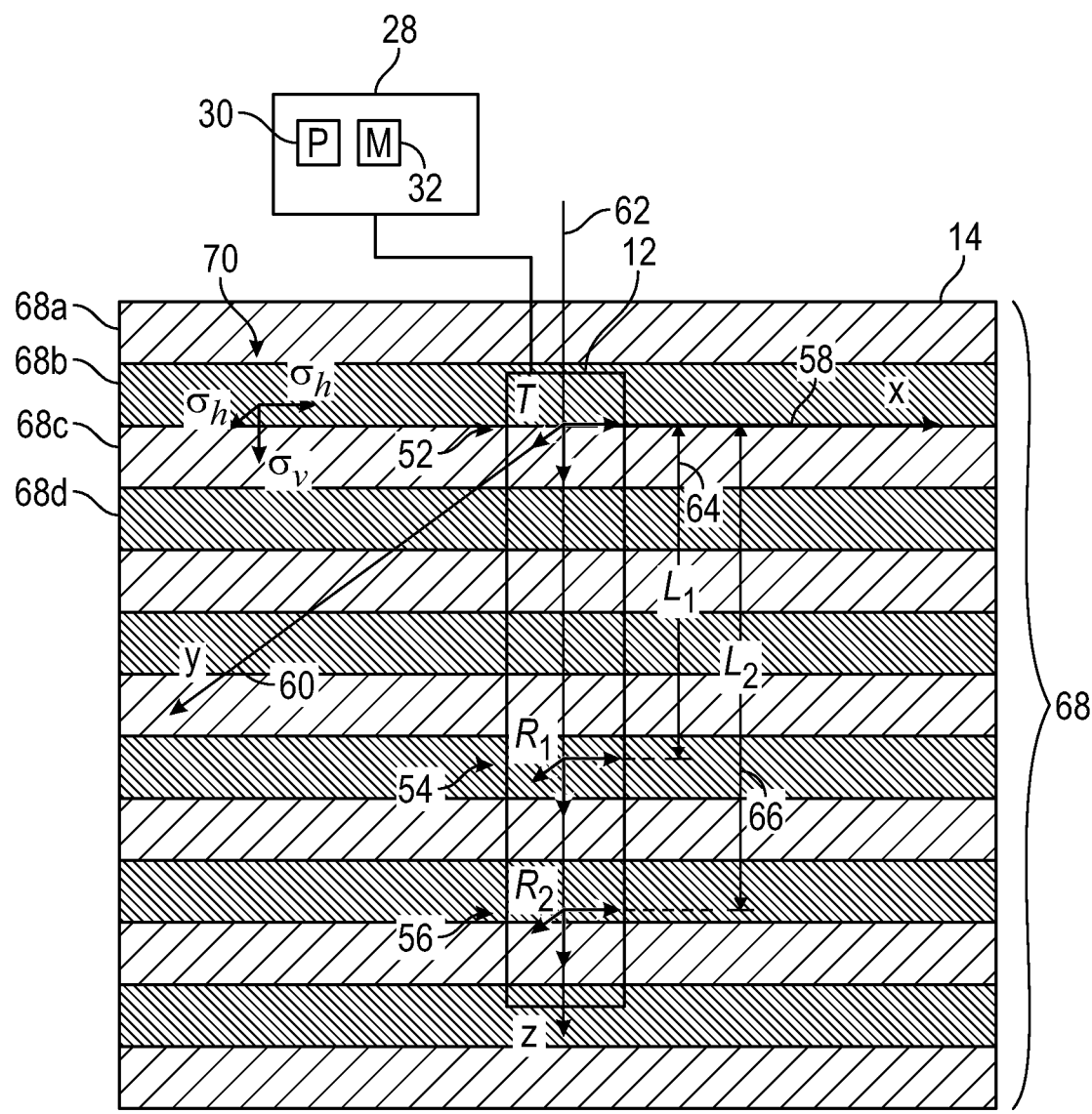
FIG. 3 is a schematic diagram of a downhole multi-axial array that may be used to acquire propagation measurements, in accordance with aspects of the present disclosure.

With the foregoing in mind, FIG. 3 shows an illustrated embodiment of a propagation well logging tool 12 that is a multi-axial EM downhole tool with mutually orthogonal and collocated transmitter and receiver coils. As shown in the illustrated embodiment, the propagation well logging tool 12 includes three transmitters 52, three first receivers 54, and three second receivers 56. Generally speaking, the three transmitters 52 induce electric eddy current in the formation that flow parallel to orthogonal planes oriented with their normals in the X (e.g., along the X-axis 58), Y (e.g., along the Y-axis 60), and Z directions (e.g., along the Z-axis 62, referred to herein as the "downhole tool axis", "tool axis" or "longitudinal tool axis"), which are defined by the directions of the magnetic dipole moments of each of the three transmitter coils. As such, the propagation well logging tool 12 shown in FIG. 3 may measure all nine orthogonal couplings to determine formation resistivity and resistivity anisotropy as well as formation dip. While the illustrated embodiment of the propagation well logging tool 12 is a triaxial EM downhole tool (e.g., each receiver of the first receivers 54 and the second receivers 56 shown in FIG. 3 are along X-axis 58, Y-axis 60, and Z-axis 62), the number of axes that include receivers is not limited to three, but maybe two or more.

As shown in the illustrated embodiment, the first receivers 54 are disposed at a longitudinal distance 64 from the transmitters 52, and the second receivers 56 are disposed at a longitudinal distance 66 from the transmitters 52. As discussed in more detail below regarding the discussion of FIGS. 4 and 5, the longitudinal distances 64 and 66 may be used as a tool constant, which may facilitate calculation of the apparent conductivity and/or apparent resistivity.

The illustrated example of the propagation well logging tool 12 is shown communicatively coupled to the data processing system 28. As discussed herein, the propagation well logging tool 12 (e.g., multi-axial well logging tool) may acquire measurements within a wellbore 16 of the geological formation 14. The processor 30 of the data processing system 28 may receive these measurements. The memory 32 may store information such as control software, frequency, configuration data, etc. The memory 32 may include a volatile memory, such as random access memory (RAM), and/or a nonvolatile memory, such as read-only memory (ROM). The memory 32 may store a variety of information and may be used for various purposes. For example, the memory 32 may store processor-executable instructions including firmware or software for the processor 30 to execute. In some embodiments, the memory 32 is a tangible, non-transitory, machine-readable-medium that may store machine-readable instructions for the processor 30 to execute. The memory 32 may include ROM, flash memory, a hard drive, or any other suitable optical, magnetic, or solid-state storage medium, or a combination thereof. The memory 32 may store data, instructions, and any other suitable data.

As shown in the illustrated embodiment, the propagation well logging tool 12 is within a geological formation 14 having conductivity and permittivity with a traverse isotropy. In the illustrated embodiment, the downhole tool axis (e.g., Z-axis 62) of the triaxial propagation well logging tool 12 is aligned to the normal of the lamination planes 68 (e.g., the interfaces of geological layers). Each lamination (e.g., geological layer), a few of which are shown (e.g., 68a, 68b, 68c, and 68d), of the geological formation 14 has a conductivity and/or a permittivity that is approximately homogeneous along X-axis 58 and the Y-axis 60, while the conductivity and/or permittivity may vary along the Z-axis 62. In the current embodiment, all the light-colored laminations (e.g., 68a and 68c) share the same conductivity, and all the dark-colored laminations (e.g., 68b and 68d) share the same conductivity. Therefore, the conductivity, σ, and the permittivity, ε, of all laminations as a whole may be represented by the equations:

$$\bar{\sigma} = \sigma_h(\hat{x}\hat{x} + \hat{y}\hat{y}) + \sigma_v \hat{z}\hat{z} \quad (1)$$

$$\bar{\varepsilon} = \varepsilon_h(\hat{x}\hat{x} + \hat{y}\hat{y}) + \varepsilon_v \hat{z}\hat{z} \quad (2)$$

where $\sigma_h$ and $\sigma_v$ are the horizontal conductivities (e.g., along the X-axis 58 and the Y-axis 60) and the vertical conductivities (e.g., along the Z-axis 62), respectively, and $\varepsilon_h$ and $\varepsilon_v$ are the horizontal permittivity and the vertical permittivity, respectively. The general directions of the horizontal conductivities and vertical conductivities are shown in the axis 70. The unit vectors $\hat{x}$, $\hat{y}$, and $\hat{z}$ correspond to X-axis 58, Y-axis 60, and Z-axis 62. As referred to herein, the transmitters 52 and the receivers (e.g., first receivers 54 and second receivers 56) that are generally aligned with the X-axis 58 and the Y-axis 60 are referred to as being coplanar (e.g., coplanar transmitters and/or coplanar receivers) and the transmitters 52 and the receivers (e.g., first receivers 54 and second receivers 56) that are generally aligned with the Z-axis 62 are referred to as being coaxial or coaxial receivers (e.g., coaxial transmitters and/or coaxial receivers).

Figure 4:
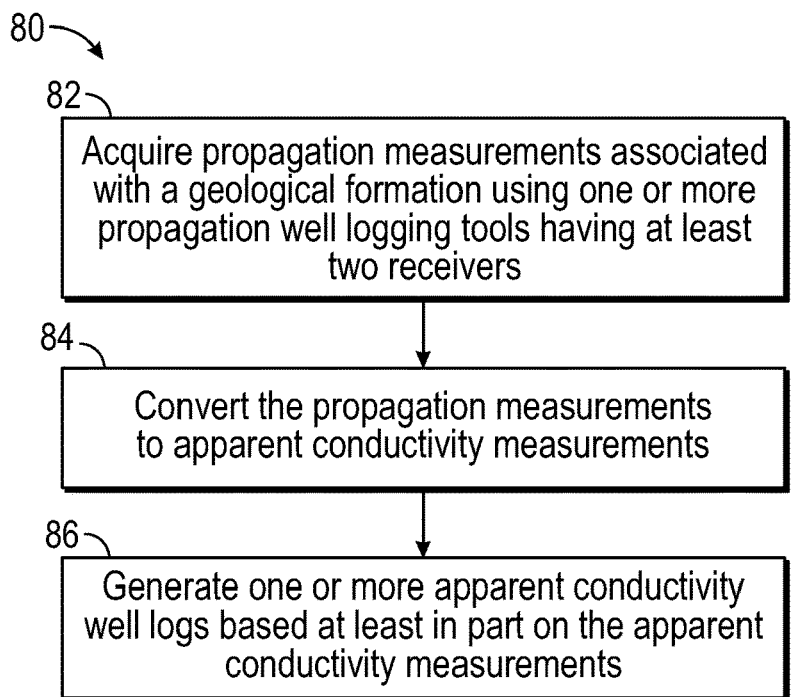
FIG. 4 is a flow chart representing an embodiment of a process for generating apparent conductivity well logs based at least in part on propagation measurements, in accordance with aspects of the present disclosure.

With the foregoing in mind, FIG. 4 is a flow diagram of a process 80 for generating one or more apparent conductivity well logs based at least in part on propagation measurements acquired by the propagation well logging tool 12. Although described in a particular order, which represents a particular embodiment, it should be noted that the process 80 may be performed in any suitable order. Additionally, embodiments of the process 80 may omit process blocks and/or include additional process blocks. Moreover, in some embodiments, the process 80 may be implemented at least in part by executing instructions stored in a tangible, non-transitory, computer-readable medium, such as memory 32, using processing circuitry, such as processor 30 implemented in the data processing system 28

Generally, the process 80 includes acquiring (process block 82) propagation measurements associated with a geological formation using one or more propagation well logging tools having at least two receivers (e.g., a first receiver 54 and a second receiver 56). The process 80 also includes converting (process block 84) the propagation measurements to apparent conductivity measurements based at least in part on a frequency associated with the propagation measurement, a relatively longitudinal position of the receivers (e.g., a first receiver 54 and a second receiver 56), and a phase shift measurement and/or an attenuation measurement. Further, the process 80 includes generating (process block 86) one or more apparent conductivity well logs based at least in part on the apparent conductivity measurements. While process 80 is discussed above with respect to apparent conductivity measurements, it should be noted that the apparent conductivity may also be represented as an apparent resistivity measurement.

In process block 82, the data processing system 28 (e.g., processor 30) may receive and/or acquire propagation measurements from a propagation well logging tool 12. In some embodiments, acquiring the propagation measurements from the propagation well logging tool 12 may include the processor 30 sending suitable control signals to the propagation well logging tool 12 to begin acquiring the propagation measurements. As discussed herein, the propagation measurements may include phase shift measurements and/or attenuation measurements.

In process block 84, the processor 30 may convert the propagation measurements to apparent conductivity measurements based on a frequency (e.g., an operating frequency of the propagation well logging tool 12 such as approximately 100 kHz, 200 kHz, 400 kHz, 1000 kHz, 2000 kHz, 2 MHz, and the like). It should be noted that converting the propagation measurements may depend on the orientation of the receivers (e.g., a first receiver 54 and a second receiver 56) and the transmitter(s) 52 of the propagation well logging tool 12. That is, in some embodiments, the propagation measurements may be acquired by a coaxial propagation well logging tool, a coplanar propagation well logging tool, a triaxial propagation well logging tool, and the like, as discussed in further detail below. In any case, the processor 30 may convert the propagation measurements based on a relative longitudinal position of the receivers (e.g., a first receiver 54 and a second receiver 56) as discussed in further detail below (e.g., with regards to equation 31). Then, in process block 86, the processor 30 may generating apparent conductivity well logs based on the apparent conductivity measurements.

The discussion below provides an example for converting the propagation measurements to apparent conductivity, as described above with regards to process block 84. For a coaxial propagation downhole tool (e.g., having transmitter coil and receiver coils that are oriented along the Z-axis 62, the voltages induced in the two receiver coils (e.g., the first receiver 54 and the second receiver 56) are:

$$V_{zz,j} = \frac{i\omega\mu I N_T N_{R_j} A_R A_{R_j}}{2\pi L_j^3} e^{ik_h L_j}(1 - ik_h L_j) \quad (3)$$

And for a coplanar propagation downhole tool (e.g., having transmitter coil and receiver coils oriented along the X-axis 58 or Y-axis 60), the voltages induced in the two receiver coils are:

$$V_{xx,j} = -\frac{i\omega\mu I N_T N_{R_j} A_R A_{R_j}}{4\pi L_j^3} e^{ik_h L_j}\left(1 - ik_h L_j - \frac{1}{2}(k_h^2 L_j^2 + k_v^2 L_j^2)\right) \quad (4)$$

For both Eqns. (3) and (4), I is the current in the transmitter coil, $\omega$ is the angular frequency, $\omega=2\pi f$ where f is the frequency of current I. $N_T$ and $N_{R_j}$, j=1, 2 are the numbers of turns of transmitter and receiver coils, and $A_T$ and $A_{R_j}$, j=1, 2 are their areas. i is the imaginary unit, $i=\sqrt{-1}$; $L_j$, j=1, 2 is the distance between transmitter and receiver coils. It is assumed that receiver 2 is further away than receiver 1 from the transmitter (i.e., $L_1 < L_2$). $k_h$ and $k_v$ are wavenumbers corresponding to $\sigma_h$ and $\varepsilon_h$, and $\sigma_v$ and $\varepsilon_v$, respectively, given by:

$$k_h = \sqrt{i\omega\mu(\sigma_h - i\omega\varepsilon_h)} \quad (5)$$

$$k_v = \sqrt{i\omega\mu(\sigma_v - i\omega\varepsilon_v)} \quad (6)$$

In some embodiments, $k_h$ and $k_v$ may be expressed in terms of a complex number:

$$k_h = \sqrt{\frac{1}{2}\omega\mu\left(\sqrt{\sigma_h^2 + \omega^2\varepsilon_h^2} + \omega\varepsilon_h\right)} + \\ i\sqrt{\frac{1}{2}\omega\mu\left(\sqrt{\sigma_h^2 + \omega^2\varepsilon_h^2} - \omega\varepsilon_h\right)} \equiv \alpha_h + i\beta_h \quad (7)$$

$$k_v = \sqrt{\frac{1}{2}\omega\mu\left(\sqrt{\sigma_v^2 + \omega^2\varepsilon_v^2} + \omega\varepsilon_v\right)} + \\ i\sqrt{\frac{1}{2}\omega\mu\left(\sqrt{\sigma_v^2 + \omega^2\varepsilon_v^2} - \omega\varepsilon_v\right)} \equiv \alpha_v + i\beta_v \quad (8)$$

In the above, $\alpha_h$ and $\alpha_v$ are phase shifts corresponding to $\sigma_h$ and $\varepsilon_h$, and $\sigma_v$ and $\varepsilon_v$, respectively; $\beta_h$ and $\beta_v$ are attenuations corresponding to $\sigma_h$ and $\varepsilon_h$, and $\sigma_v$ and $\varepsilon_v$, respectively.

In certain conventional propagation processing techniques, the ratio of voltages at the two receivers (e.g., first receiver 54 and second receiver 56) is acquired and converted to phase shift and attenuation. The voltage ratio measurement can compensate for transmitter gains. A composite downhole tool using two or more transmitter coils may provide compensation for receiver gains and borehole rugosity. In the following, low-frequency asymptotic expressions of phase shift and attenuation are derived for an elemental downhole tool. Low-frequency asymptotic expressions of a fully compensated downhole well logging tool consisting of multiple transmitters and receivers are then given by means of the superposition of those of elemental downhole tools.

Expansion of the Voltage Ratio of an Elemental Coaxial Propagation Tool

As discussed above, certain technique for using propagation measurements utilize the ratio of the voltages measured by the receivers. For the co-axial propagation well logging tool, the logarithm of the ratio of the voltages at the receivers are, in accordance with equation 3:

$$\ln\frac{V_{zz,1}}{V_{zz,2}} = \ln\frac{\frac{i\omega\mu I N_T N_{R_1} A_R A_{R_1}}{2\pi L_1^3} e^{ik_h L_1}(1 - ik_h L_1)}{\frac{i\omega\mu I N_T N_{R_2} A_R A_{R_2}}{2\pi L_2^3} e^{ik_h L_2}(1 - ik_h L_2)} \quad (9)$$

Denoting the moment of the receivers by $M_{R_j} = N_{R_j} A_{R_j}$ and j=1, 2, then:

$$\ln\frac{V_{zz,1}}{V_{zz,2}} = \ln\frac{\frac{M_{R_1}}{L_1^3} e^{ik_h L_1}(1 - ik_h L_1)}{\frac{M_{R_2}}{L_2^3} e^{ik_h L_2}(1 - ik_h L_2)} = \quad (10)$$

$$\ln\frac{L_2^3}{L_1^3}\frac{M_{R_1}}{M_{R_2}} + ik_h(L_1 - L_2) + \ln\frac{(1 - ik_h L_1)}{(1 - ik_h L_2)}$$

Without loss of generality, assuming that $M_{R_1} = M_{R_2}$, then:

$$\ln\frac{V_{zz,1}}{V_{zz,2}} = 3\ln\frac{L_2}{L_1} + ik_h(L_1 - L_2) + \ln\frac{(1 - ik_h L_1)}{(1 - ik_h L_2)} \quad (11)$$

Eqn. 11 may be expanded in powers of $k_h L$ using Taylor's expansion for the ln z function:

$$\ln z = (z - 1) - \frac{1}{2}(z - 1)^2 + \frac{1}{3}(z - 1)^3 - \cdots, |z - 1| \le 1, z \ne 0 \quad (12)$$

Using Eqn. 12, the third term on the right-hand side of Eqn. 10 may be written as:

$$\ln\frac{1 - ik_h L_1}{1 - ik_h L_2} = \left(\frac{1 - ik_h L_1}{1 - ik_h L_2} - 1\right) - \quad (13)$$

$$\frac{1}{2}\left(\frac{1 - ik_h L_1}{1 - ik_h L_2} - 1\right)^2 + \frac{1}{3}\left(\frac{1 - ik_h L_1}{ik_h L_2} - 1\right)^3$$

Letting:

$$\Delta L \equiv L_2 - L_1 \quad (14)$$

And noting that:

$$\frac{1 - ik_h L_1}{1 - ik_h L_2} - 1 = \frac{1 - ik_h L_1 - (1 - ik_h L_2)}{1 - ik_h L_2} = \frac{ik_h(L_1 - L_2)}{1 - ik_h L_2} = \frac{ik_h \Delta L}{1 - ik_h L_2} \quad (15)$$

Using Eqns. (14) and (15), Eqn. (13) becomes:

$$\ln\frac{1-ik_hL_1}{1-ik_hL_2} = 3\ln\frac{L_2}{L_1} - ik_h\Delta L + \left(\frac{ik_h\Delta L}{1-ik_hL_2}\right) - \frac{1}{2}\left(\frac{ik_h\Delta L}{1-ik_hL_2}\right)^2 + \frac{1}{3}\left(\frac{ik_h\Delta L}{1-ik_hL_2}\right)^3 - \cdots \quad (16)$$

Noting that:

$$\frac{1}{z-1} = 1 + z + z^2 + z^3 + \cdots, |z| < 1 \quad (17)$$

Therefore, when $|ik_hL_2| < 1$:

$$\frac{ik_h\Delta L}{1-ik_hL_2} = ik_h\Delta L - k_h^2\Delta LL_2 - ik_h^3\Delta LL_2^2 + \cdots \quad (18)$$

$$-\frac{1}{2}\left(\frac{ik_h\Delta L}{1-ik_hL_2}\right)^2 = +\frac{1}{2}k_h^2\Delta L^2 + ik_h^3\Delta L^2 L_2 - \cdots \quad (19)$$

$$\frac{1}{3}\left(\frac{ik_h\Delta L}{1-ik_hL_2}\right)^3 = -\frac{1}{3}ik_h^3\Delta L^3 + \cdots \quad (20)$$

Substituting Eqns. (18)-(20) into Eqn. (16) produces:

$$\ln\frac{V_{zz,1}}{V_{zz,2}} = 3\ln\frac{L_2}{L_1} - k_h^2\frac{1}{2}(L_2^2 - L_1^2)\frac{\Delta L}{L_2}\left(1 - \frac{\Delta L}{L_2} + \frac{1}{3}\left(\frac{\Delta L}{L_2}\right)^2\right) + \cdots \quad (21)$$

The first term on the right-hand side of Eqn. (21) is attributed to the geometrical decay of EM wave in the air and can be removed from the two sides. Then:

$$\ln\frac{V_{zz,1}}{V_{zz,2}}\bigg|_{ACCR} \equiv \ln\frac{V_{zz,1}}{V_{zz,2}} - 3\ln\frac{L_2}{L_1} \quad (22)$$

$$= -k_h^2\frac{1}{2}(L_2^2 - L_1^2) - ik_h^3L_2^3\frac{\Delta L}{L_2}\left(1 - \frac{\Delta L}{L_2} + \frac{1}{3}\left(\frac{\Delta L}{L_2}\right)^2\right) + \cdots$$

It is noted that the first order term $-ik_h\Delta L$ in Eqn. (16) is cancelled out due to the first term of Eqn. (16). When the frequency is low $$\ln\frac{V_{zz,1}}{V_{zz,2}}\bigg|_{ACCR} \approx -k_h^2\frac{1}{2}(L_2^2 - L_1^2). \quad (23)$$

Recall that:

$$k_h^2 = \omega\mu(\omega\varepsilon_h + i\sigma_h), \quad (24)$$

Therefore:

$$\ln\frac{V_{zz,1}}{V_{zz,2}}\bigg|_{ACCR} \approx -\frac{1}{2}(L_2^2 - L_1^2)\omega\mu(\omega\varepsilon_h + i\sigma_h) \quad (25)$$

The above asymptotic form suggests that the attenuation and phase shift measurements can be converted to apparent conductivity as is normally done for induction measurements. To this end, let:

$$\ln\frac{V_{zz,1}}{V_{zz,2}}\bigg|_{ACCR} \equiv AT_{zz} + iPS_{zz}. \quad (26)$$

Using the polar form of the two complex voltages, i.e.:

$$V_{zz,j} = |V_{zz,j}|e^{i\phi_{zz,j}}, j=1,2. \quad (27)$$

the attenuation and phase shift in Eqn. (26) can be written as:

$$AT_{zz} = \ln\frac{|V_{zz,1}|}{|V_{zz,2}|} - 3\ln\frac{L_2}{L_1}. \quad (28)$$

$$PS_{zz} = \phi_{zz,1} - \phi_{zz,2}. \quad (29)$$

According to Eqns. (25) and (26):

$$AT_{zz} + iPS_{zz} \approx -\frac{1}{2}(L_2^2 - L_1^2)\omega\mu(\omega\varepsilon_h + i\sigma_h) \quad (30)$$

A downhole tool constant may be defined for the coaxial propagation well logging tool:

$$K_{zz} \equiv -\frac{1}{2}(L_2^2 - L_1^2)\omega\mu K_{zz} \equiv -\frac{1}{2}(L_2^2 - L_1^2)\omega\mu \quad (31)$$

then the apparent conductivity of the coaxial propagation downhole tool is:

$$\sigma_{a,zz} \equiv \frac{1}{K_{zz}}\ln\frac{V_{zz,1}}{V_{zz,2}}\bigg|_{ACCR}, \quad (32)$$

With Eqn. (30):

$$\sigma_{a,zz}^{AT} \equiv \text{Re}(\sigma_{a,zz}) = \frac{AT_{zz}}{K_{zz}} \approx \omega\varepsilon_h, \quad (33)$$

$$\sigma_{a,zz}^{PS} \equiv \text{Im}(\sigma_{a,zz}) = \frac{PS_{zz}}{K_{zz}} \approx \sigma_h. \quad (34)$$

The asymptotic forms in the above are opposite to those of apparent conductivity for the coaxial induction downhole tool. Alternatively, the apparent conductivity can be defined as:

$$\sigma_{a,zz} \equiv -\frac{1}{K_{zz}}i\ln\frac{V_{zz,1}}{V_{zz,2}}\bigg|_{ACCR}. \quad (35)$$

Then:

$$\sigma_{a,zz}^{PS} \equiv \text{Re}(\sigma_{a,zz}) = \frac{PS_{zz}}{K_{zz}} \approx \sigma_h, \quad (36)$$

$$\sigma_{a,zz}^{AT} \equiv \text{Im}(\sigma_{a,zz}) = -\frac{AT_{zz}}{K_{zz}} \approx -\omega\varepsilon_h. \quad (37)$$

The asymptotic forms of the second definition for the apparent conductivity are the same as those of the coaxial induction downhole tool. Both forms of the definition indicate that the phase shift apparent conductivity $\sigma_{a,zz}^{PS}$ is a measure of conductivity and the attenuation apparent conductivity $\sigma_{a,zz}^{AT}$ a measure of permittivity or dielectric constant when the frequency is low.

Expansion of the Voltage Ratio of an Elemental Coplanar Propagation Downhole Tool

The logarithm of the ratio of voltages at the two coplanar receivers is:

$$\ln\frac{V_{xx,1}}{V_{xx,2}} = \ln\frac{-\frac{i\omega\mu IN_T N_{R_1} A_T A_{R_1}}{4\pi L_1^3}e^{ik_h L_1}\left(1 - ik_h L_1 - \frac{1}{2}(k_h^2 L_1^2 + k_v^2 L_1^2)\right)}{-\frac{i\omega\mu IN_T N_{R_2} A_T A_{R_2}}{4\pi L_2^3}e^{ik_h L_2}\left(1 - ik_h L_2 - \frac{1}{2}(k_h^2 L_2^2 + k_v^2 L_2^2)\right)}. \quad (38)$$

As with the ratio for the coaxial propagation downhole tool, assuming that $N_{R_1}A_{R_1}=N_{R_2}A_{R_2}$, or $M_{R_1}=M_{R_2}$, then:

$$\ln\frac{V_{xx,1}}{V_{xx,2}} = 3\ln\frac{L_2}{L_1} + ik_h(L_1 - L_2) + \ln\frac{1 - ik_h L_1 - \frac{1}{2}(k_h^2 L_1^2 + k_v^2 L_1^2)}{1 - ik_h L_2 - \frac{1}{2}(k_h^2 L_2^2 + k_v^2 L_2^2)}. \quad (39)$$

In some embodiments, an error calibration may be performed to account for the shield and tool geometry that may improve the measurements, in at least some instances. The error calibration may include determining the attenuation and/or phase shift measurements for the tool in air (e.g., by acquiring an additional propagation measurement at the surface above the geological formation, in a lab, and the like) and/or under ambient conditions and then modifying the propagation measurements obtained downhole accordingly, such as via a background subtraction.

According to Eqn. (9), the third part of Eqn. (37) can be expanded as:

$$\ln\frac{1 - ik_h L_1 - \frac{1}{2}(k_h^2 L_1^2 + k_v^2 L_1^2)}{1 - ik_h L_2 - \frac{1}{2}(k_h^2 L_2^2 + k_v^2 L_2^2)} = \left(\frac{1 - ik_h L_1 - \frac{1}{2}(k_h^2 L_1^2 + k_v^2 L_1^2)}{1 - ik_h L_2 - \frac{1}{2}(k_h^2 L_2^2 + k_v^2 L_2^2)} - 1\right) - \quad (40)$$

$$\frac{1}{2}\left(\frac{1 - ik_h L_1 - \frac{1}{2}(k_h^2 L_1^2 + k_v^2 L_1^2)}{1 - ik_h L_2 - \frac{1}{2}(k_h^2 L_2^2 + k_v^2 L_2^2)} - 1\right)^2 +$$

$$\frac{1}{3}\left(\frac{1 - ik_h L_1 - \frac{1}{2}(k_h^2 L_1^2 + k_v^2 L_1^2)}{1 - ik_h L_2 - \frac{1}{2}(k_h^2 L_2^2 + k_v^2 L_2^2)} - 1\right)^3 - \ldots$$

Note that:

$$\frac{1 - ik_h L_1 - \frac{1}{2}(k_h^2 L_1^2 + k_v^2 L_1^2)}{1 - ik_h L_2 - \frac{1}{2}(k_h^2 L_2^2 + k_v^2 L_2^2)} - 1 = \frac{ik_h\Delta L + (k_h^2 + k_v^2)L_M\Delta L}{1 - ik_h L_2 - \frac{1}{2}(k_h^2 + k_v^2)L_2^2}, \quad (41)$$

Where:

$$L_M \equiv \frac{1}{2}(L_1 + L_2). \quad (42)$$

Recall the expansion given in Eqn. (17), when $$\left|ik_h L_2 + \frac{1}{2}(k_h^2 + k_v^2)L_2^2\right| < 1, \quad (43)$$

$$\frac{ik_h\Delta L + (k_h^2 + k_v^2)L_M\Delta L}{1 - ik_h L_2 - \frac{1}{2}(k_h^2 + k_v^2)L_2^2} = ik_h\Delta L + \left[(k_h^2 + k_v^2)L_M\Delta L - k_h^2 L_2\Delta L\right] +$$

$$\left[ik_h(k_h^2 + k_v^2)L_2 L_M\Delta L - \frac{1}{2}ik_h(k_h^2 - k_v^2)L_2^2\Delta L\right] - \ldots$$

$$-\frac{1}{2}\left(\frac{ik_h\Delta L + (k_h^2 + k_v^2)L_M\Delta L}{1 - ik_h L_2 - \frac{1}{2}(k_h^2 + k_v^2)L_2^2}\right)^2 = \quad (44)$$

$$\frac{1}{2}k_h^2\Delta L^2 - \left[ik_h(k_h^2 + k_v^2)L_2 L_M\Delta L^2 - ik_h^3 L_2\Delta L^2\right] - \ldots$$

$$\frac{1}{3}\left(\frac{ik_h\Delta L + (k_h^2 + k_v^2)L_M\Delta L}{1 - ik_h L_2 - \frac{1}{2}(k_h^2 + k_v^2)L_2^2}\right)^3 = -\frac{1}{3}ik_h^3\Delta L^3 + \ldots \quad (45)$$

Substituting Eqns. (43)-(45) into Eqn. (39), and rearranging the results, it can be shown that:

$$\ln\frac{V_{xx,1}}{V_{xx,2}} = 3\ln\frac{L_2}{L_1} + k_v^2 L_M\Delta L + \quad (46)$$

$$ik_h^3\left(\frac{1}{2}L_1 L_2 + \frac{1}{6}\Delta L^2\right)\Delta L + ik_h k_v^2\frac{1}{2}(L_1^2 + L_1 L_2 + L_2^2)\Delta L + \ldots$$

It is noted that the first order term $-ik_h\Delta L$ in Eqn. (39) is cancelled out due to the first term of Eqn. (43). Moreover, the second order term of $k_h$ in Eqn. (43) is also cancelled out due to the first term of Eqn. (44). Therefore, the only second term is that of $k_v$. As with Eqn. (22), the first term on the right-hand side of Eqn. (46) is the geometrical decay of EM wave in the air and can be removed from the two sides. Then:

$$\ln\frac{V_{xx,1}}{V_{xx,2}}\bigg|_{ACCR} \equiv \ln\frac{V_{xx,1}}{V_{xx,2}} - 3\ln\frac{L_2}{L_1} = \quad (47)$$

$$k_v^2 L_M\Delta L + ik_h^3\left(\frac{1}{2}L_1 L_2 + \frac{1}{6}\Delta L^2\right)\Delta L + ik_h k_v^2\frac{1}{2}(L_1^2 + L_1 L_2 + L_2^2)\Delta L + \ldots$$

When the frequency is low:

$$\ln\frac{V_{xx,1}}{V_{xx,2}}\bigg|_{ACCR} \approx k_v^2 L_M\Delta L = k_v^2\frac{1}{2}(L_2^2 - L_1^2). \quad (48)$$

Recall that:

$$k_v^2 = \omega\mu(\omega\varepsilon_v + i\sigma_v), \quad (49)$$

Therefore:

$$\ln\frac{V_{xx,1}}{V_{xx,2}}\bigg|_{ACCR} \approx \frac{1}{2}(L_2^2 - L_1^2)\omega\mu(\omega\varepsilon_v + i\sigma_v). \quad (50)$$

As with Eqn. (25), the asymptotic form in the above suggests that the attenuation and phase shift measurements can be converted to apparent conductivity measurements. In a similar manner, let:

$$\ln\frac{V_{xx,1}}{V_{xx,2}}\bigg|_{ACCR} \equiv AT_{xx} + iPS_{xx}. \quad (51)$$

Using the polar form of the two complex voltages, i.e.:

$$V_{xx,j}=|V_{xx,j}|e^{i\phi_{xx,j}}, j=1,2. \quad (52)$$

The attenuation and phase shift in Eqn. (51) can be written as:

$$AT_{xx} = \ln\frac{|V_{xx,1}|}{|V_{xx,2}|} = 3\ln\frac{L_2}{L_1}. \quad (53)$$

$$PS_{xx} = \phi_{xx,1} - \phi_{xx,2}. \quad (54)$$

According to Eqn. (50):

$$AT_{xx} + iPS_{xx} \approx \frac{1}{2}(L_2^2 - L_1^2)\omega\mu(\omega\varepsilon_v + i\sigma_v). \quad (55)$$

Define the following downhole tool constant for the coplanar propagation downhole tool:

$$K_{xx} \equiv \frac{1}{2}(L_2^2 - L_1^2)\omega\mu. \quad (56)$$

Accordingly, the apparent conductivity of the coplanar propagation downhole tool is:

$$\sigma_{a,xx} \equiv \frac{1}{K_{xx}}\ln\frac{V_{xx,1}}{V_{xx,2}}\bigg|_{ACCR}, \quad (57)$$

With Eqn. (51):

$$\sigma_{a,xx}^{AT} \equiv \text{Re}(\sigma_{a,xx}) = \frac{AT_{xx}}{K_{xx}} \approx \omega\varepsilon_v. \quad (58)$$

$$\sigma_{a,xx}^{PS} \equiv \text{Im}(\sigma_{a,xx}) = \frac{PS_{xx}}{K_{xx}} \approx \sigma_v. \quad (59)$$

The asymptotic forms in the above are opposite to those of apparent conductivity for the coplanar induction downhole tool. As with the coaxial voltage ratio, an alternative to the apparent conductivity of Eqn. (57) may be given by:

$$\sigma_{a,xx} \equiv \frac{1}{K_{xx}}i\ln\frac{V_{xx,1}}{V_{xx,2}}\bigg|_{ACCR}. \quad (60)$$

Accordingly:

$$\sigma_{a,xx}^{PS} \equiv \text{Re}(\sigma_{a,xx}) = \frac{PS_{xx}}{K_{xx}} \approx \sigma_v. \quad (61)$$

$$\sigma_{a,xx}^{AT} \equiv \text{Im}(\sigma_{a,xx}) = -\frac{AT_{xx}}{K_{xx}} \approx -\omega\varepsilon_v. \quad (62)$$

The asymptotic forms of the second definition for the apparent conductivity are the same as those of the coplanar induction downhole tool. Both forms of the definition indicate that the phase shift apparent conductivity $\sigma_{a,xx}^{PS}$ is a measure of conductivity and the attenuation apparent conductivity $\sigma_{a,xx}^{AT}$ a measure of permittivity or dielectric constant when the frequency is low.

Apparent Conductivity of a Fully Compensated Propagation Downhole Tool

A fully compensated propagation downhole tool may compensate for both the transmitter and receiver gains. In one example, the z-axis of the downhole tool coordinates coincides with the downhole tool axis (e.g., Z-axis 62), and there are in total $N_T$ transmitters, some of which are below $R_1$ and $R_2$, and the rest of which are above $R_1$ and $R_2$. The positive direction of the Z-axis is pointed from $R_1$ to $R_2$. If $T_l$, the l-th transmitter is on the lower side of the two receivers, the logarithmic voltage ratio of $R_1$ and $R_2$ is:

$$\ln\frac{V'_{T_lR_1}}{V'_{T_lR_2}} = \ln\frac{g_{T_l}g_{R_1}V_{T_lR_1}}{g_{T_l}g_{R_1}V_{T_lR_2}} = \ln\frac{g_{R_1}V_{T_lR_1}}{g_{R_1}V_{T_lR_2}}. \quad (63)$$

If $T_l$ is on the upper side of the receivers, the voltage ratio is:

$$\ln\frac{V'_{T_lR_2}}{V'_{T_lR_1}} = \ln\frac{g_{T_l}g_{R_2}V_{T_lR_2}}{g_{T_l}g_{R_1}V_{T_lR_1}} = \ln\frac{g_{R_2}V_{T_lR_2}}{g_{R_1}V_{T_lR_1}}. \quad (64)$$

Eqns. (63) and (64) can be combined into one equation such that:

$$\gamma_l\ln\frac{V'_{T_lR_1}}{V'_{T_lR_2}} = \gamma_l\ln\frac{g_{R_1}V_{T_lR_1}}{g_{R_2}V_{T_lR_2}}. \quad (65)$$

where $\gamma_l=\text{sgn}(L_{T_lR_2}-L_{T_lR_1})$, with the symbol "sgn" designating the signum function. Here, $L_{T_lR_1}$ and $L_{T_lR_2}$ are the spacings of the first receiver 54, $R_1$, and the second receiver 56, $R_2$, from transmitter $T_l$. A compensated voltage ratio of the downhole tool is the weighted average of all the individual voltage ratios:

$$AT_C + iPS_C \equiv \sum_{l=1}^{N_T}\gamma_l C_l \ln\frac{g_{R_1}V_{T_lR_1}}{g_{R_2}V_{T_lR_2}}. \quad (66)$$

The terms related to receiver gains can be separated out, yielding:

$$AT_C + iPS_C = \ln\frac{g_{R_1}}{g_{R_2}}\sum_{l=1}^{N_T}\gamma_l C_l + \sum_{l=1}^{N_T}\gamma_l C_l \ln\frac{V_{T_lR_1}}{V_{T_lR_2}}. \quad (67)$$

For a fully compensated downhole tool:

$$\sum_{l=1}^{N_T}\gamma_l C_l = 0. \quad (68)$$

The above compensation condition must be satisfied so that the receiver gains are eliminated from the combined logarithmic voltage ratio given in Eqn. (67). With this in mind, Eqn. (67) becomes:

$$AT_C + iPS_C = \sum_{l=1}^{N_T} \gamma_l C_l \ln \frac{V_{T_l R_1}}{V_{T_l R_2}}. \quad (69)$$

For the l-th transmitter, the voltage ratio can be written as:

$$\gamma_l \ln \frac{V_{T_l R_1}}{V_{T_l R_2}} = \gamma_l \ln \frac{V_{T_l R_1}}{V_{T_l R_2}} \bigg|_{ACCR} + AT_{T_l}^0. \quad (70)$$

In the above equation, $AT_{T_l}^0$, is the air signal of the l-th transmitter, given by:

$$AT_{T_l}^0 = \gamma_l 3 \ln \frac{L_{T_l, R_2}}{L_{T_l, R_1}}. \quad (71)$$

It has been shown in the above that the air-signal-corrected voltage ratio can be converted to the apparent conductivity as follows:

$$\sigma_{a,T_l} = -\frac{i}{K_{T_l}} \gamma_l \ln \frac{V_{T_l R_1}}{V_{T_l R_2}} \bigg|_{ACCR}. \quad (72)$$

In the above, $K_{T_l}$ is the downhole tool constant for the elemental voltage ratio of transmitter $T_l$. For an elemental coaxial downhole tool:

$$K_{T_l} = -\frac{1}{2} \gamma_l \left( L_{T_l, R_2}^2 - L_{T_l, R_1}^2 \right). \quad (73)$$

For an elemental coplanar downhole tool:

$$K_{T_l} = +\frac{1}{2} \gamma_l \left( L_{T_l, R_2}^2 - L_{T_l, R_1}^2 \right). \quad (74)$$

Substituting Eqns. (73) and (74) in Eqn. (69) yields the following equation:

$$AT_C + iPS_C = i \sum_{l=1}^{N_T} C_l K_{T_l} \sigma_{a,T_l} + \sum_{l=1}^{N_T} C_l AT_{T_l}^0. \quad (75)$$

Recall that when the frequency is low, the apparent conductivity of an elemental voltage ratio approaches the true conductivity of the formation, i.e.:

$$\sigma_{a,T_l} \approx \sigma - i\omega\varepsilon. \quad (76)$$

Here, for a coaxial measurement, $\sigma = \sigma_h$, $\varepsilon = \varepsilon_h$; for a coplanar measurement, $\sigma = \sigma_v$, $\varepsilon = \varepsilon_v$, assuming the downhole tool axis is perpendicular to the lamination plane. Using the above asymptotic form in Eqn. (75), then:

$$AT_c + iPS_c \approx \sum_{l=1}^{N_T} C_l K_{T_l} \omega\varepsilon + i \sum_{l=1}^{N_T} C_l K_{T_l} \sigma + \sum_{l=1}^{N_T} C_l AT_{T_l}^0. \quad (77)$$

Eqn. (77) suggests that the apparent conductivity for the combined phase shift and attenuation measurements can be defined as:

$$\sigma_{a,C} \equiv -\frac{i}{K_C} \left( AT_C + iPS_C - AT_C^0 \right), \quad (78)$$

where:

$$K_C = \sum_{l=1}^{N_T} C_l K_{T_l}, \quad (79)$$

$$AT_C^0 = \sum_{i=1}^{N_T} C_l AT_{T_l}^0. \quad (80)$$

As with the apparent conductivity of an elemental voltage ratio, $\sigma_{a,C}$ of the compensated downhole tool approaches the true conductivity of the formation, $$\sigma_{a,C} \approx \sigma - i\omega\varepsilon, \quad (81)$$

when the frequency is relatively low.

Skin Effect Correction

Figure 5:
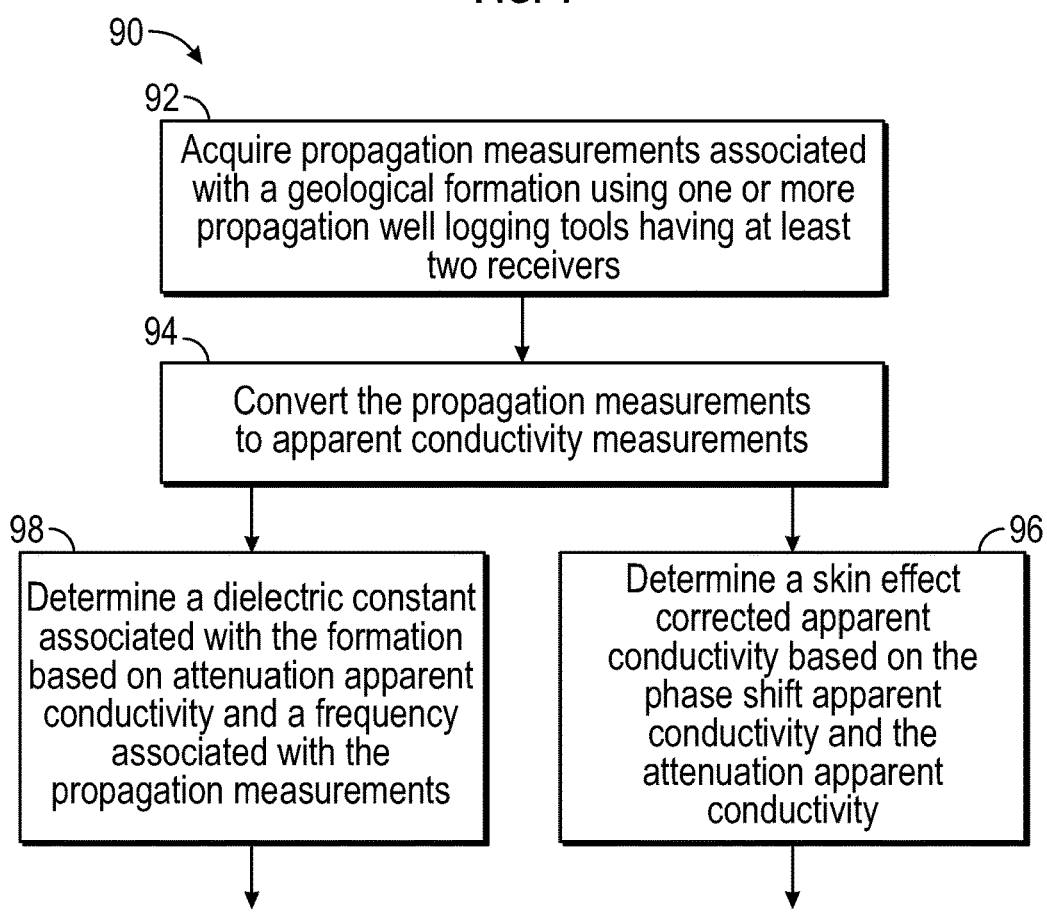
FIG. 5 is a flow chart representing an embodiment of a process for determining a dielectric constant and a skin effect corrected apparent conductivity associated with a geological formation based at least in part on propagation measurements, in accordance with aspects of the present disclosure.

FIG. 5 is a flow diagram of a process 90 for determining the apparent dielectric constant and/or a skin effect corrected apparent conductivity based at least in part on propagation measurements acquired by a propagation well logging tool 12. Although described in a particular order, which represents a particular embodiment, it should be noted that the process 90 may be performed in any suitable order. Additionally, embodiments of the process 90 may omit process blocks and/or include additional process blocks. Moreover, in some embodiments, the process 90 may be implemented at least in part by executing instructions stored in a tangible, non-transitory, computer-readable medium, such as memory 32, using processing circuitry, such as processor 30 implemented in the data processing system 28.

Generally, the process 90 includes acquiring (process block 92) propagation measurements associated with a geological formation using one or more propagation well logging tools having at least two receivers (e.g., a first receiver 54 and a second receiver 56). The process 80 also includes converting (process block 94) the propagation measurements to apparent conductivity measurements based at least in part on a frequency associated with the propagation measurement, a relatively longitudinal position of the receivers, and a phase shift measurement and/or an attenuation apparent measurement, and the apparent conductivity includes a phase shift apparent conductivity and an attenuation apparent conductivity. Further, the process 90 includes determining (process block 96) the skin effect corrected apparent conductivity based the apparent conductivity. Further still, the process 90 includes determining (process block 98) the dielectric constant based on the apparent conductivity. While process 90 is discussed above with respect to apparent conductivity measurements, it should be noted that the apparent conductivity may also be represented as an apparent resistivity measurement.

In process block 92, the data processing system 28 (e.g., processor 30) may receive and/or acquire propagation measurements from a propagation well logging tool 12. In some embodiments, acquiring the propagation measurements from the propagation well logging tool 12 may include the processor 30 sending suitable control signals to the propagation well logging tool 12 to begin acquiring the propagation measurements. As discussed herein, the propagation measurements may include phase shift measurements and/or attenuation measurements.

In process block 94, the processor 30 may covert the propagation measurements to apparent conductivity measurements based on a frequency (e.g., an operating frequency such as approximately 100 kHz, 200 kHz, 400 kHz, 1000 kHz, 2000 kHz, 2 MHz, and the like). It should be noted that converting the propagation measurements may depend on the orientation of the receivers (e.g., first receiver 54 and second receiver 56) and the transmitter(s) 52 of the propagation well logging tool 12. That is, in some embodiments, the propagation measurements may be acquired by a coaxial propagation well logging tool, a coplanar propagation well logging tool, a triaxial propagation well logging tool, and the like, as discussed in further detail below. In any case, the processor 30 may convert the propagation measurements based on a relative longitudinal position of the receivers (e.g., first receiver 54 and second receiver 56) as discussed in further detail below (e.g., with regards to equation 31). Then, in process block 96, the processor 30 may determine the skin effect corrected apparent conductivity based on the apparent conductivity, as discussed in more detail below.

Substituting Eqn. (22) in Eqn. (35), the following equation ensues $$\sigma_{a,zz} = \sigma_h - i\omega\varepsilon_h - \frac{1}{K_{zz}}k_h^3 L_2^3 \frac{\Delta L}{L_2}\left(1 - \frac{\Delta L}{L_2} + \frac{1}{3}\left(\frac{\Delta L}{L_2}\right)^2\right) + \ldots \quad (82)$$

When the displacement current is negligible, namely, when $\omega\varepsilon_h \ll \sigma_h$, Eqn. (80) reduces to $$\sigma_{a,zz} \approx \sigma_h + \frac{1}{K_{zz}}\omega\mu\sigma_h\left(\frac{1}{\delta} - i\frac{1}{\delta}\right)L_2^3 \frac{\Delta L}{L_2}\left(1 - \frac{\Delta L}{L_2} + \frac{1}{3}\left(\frac{\Delta L}{L_2}\right)^2\right) + \ldots \quad (83)$$

In component form:

$$\sigma_{a,zz}^{PS} \approx \sigma_h + \frac{1}{K_{zz}}\omega\mu\sigma_h\frac{1}{\delta}L_2^3 \frac{\Delta L}{L_2}\left(1 - \frac{\Delta L}{L_2} + \frac{1}{3}\left(\frac{\Delta L}{L_2}\right)^2\right) + \ldots, \quad (84)$$

$$\sigma_{a,zz}^{AT} \approx -\frac{1}{K_{zz}}\omega\mu\sigma_h\frac{1}{\delta}L_2^3 \frac{\Delta L}{L_2}\left(1 - \frac{\Delta L}{L_2} + \frac{1}{3}\left(\frac{\Delta L}{L_2}\right)^2\right) + \ldots. \quad (85)$$

It should be noted that the leading term of $\sigma_{a,zz}^{AT}$ is identical to the second term of aa $\sigma_{a,zz}^{PS}$ in terms of magnitude but the sign is opposite. This relationship can be used to correct the skin effect on $\sigma_{a,zz}^{PS}$ by simply adding $\sigma_{a,zz}^{AT}$ to $\sigma_{a,zz}^{PS}$, namely:

$$\sigma_{a,zz}^{PS,C} \approx \sigma_{a,zz}^{PS} + \sigma_{a,zz}^{AT}. \quad (86)$$

The above may be true for a coaxial elemental propagation downhole tool.

In a generally similar manner, for a coplanar elemental propagation downhole tool, it can be shown that when the displacement current is negligible, the following equation may hold true:

$$\sigma_{a,xx} = \sigma_v - \frac{1}{K_{xx}}\omega\mu\sigma_h\left(\frac{1}{\delta_h} - i\frac{1}{\delta_h}\right)\left(\frac{1}{2}L_1L_2 + \frac{1}{6}\Delta L^2\right)\Delta L - \quad (87)$$

$$\frac{1}{K_{xx}}\omega\mu\sigma_v\left(\frac{1}{\delta_h} - i\frac{1}{\delta_h}\right)\frac{1}{2}(L_1^2 + L_1L_2 + L_2^2)\Delta L + \ldots.$$

In component form:

$$\sigma_{a,xx}^{PS} = \sigma_v - \frac{1}{K_{xx}}\omega\mu\sigma_h\frac{1}{\delta_h}\left(\frac{1}{2}L_1L_2 + \frac{1}{6}\Delta L^2\right)\Delta L - \quad (88)$$

$$\frac{1}{K_{xx}}\omega\mu\sigma_v\frac{1}{\delta_h}\frac{1}{2}(L_1^2 + L_1L_2 + L_2^2)\Delta L + \ldots.$$

$$\sigma_{a,xx}^{AT} = \frac{1}{K_{xx}}\omega\mu\sigma_h\frac{1}{\delta_h}\left(\frac{1}{2}L_1L_2 + \frac{1}{6}\Delta L^2\right)\Delta L + \quad (89)$$

$$\frac{1}{K_{xx}}\omega\mu\sigma_v\frac{1}{\delta_h}\frac{1}{2}(L_1^2 + L_1L_2 + L_2^2)\Delta L + \ldots.$$

As with $\sigma_{a,zz}$, the leading term of $\sigma_{a,xx}^{AT}$ is identical to the second term of $\sigma_{a,xx}^{PS}$ in terms of magnitude but the sign is opposite. Likewise, this relationship can be used to correct the skin effect on $\sigma_{a,xx}^{PS}$ by simply adding $\sigma_{a,xx}^{AT}$ to $\sigma_{a,xx}^{PS}$, namely:

$$\sigma_{a,xx}^{PS,C} \approx \sigma_{a,xx}^{PS} + \sigma_{a,xx}^{AT}. \quad (90)$$

The apparent conductivity of a fully compensated downhole tool is a linear superposition of those of the underlying elemental downhole tools. Therefore, the skin effect correction schemes given in Eqns. (86) and (90) may hold true for a fully compensated downhole tool.

Apparent Dielectric Constant

Additionally or alternatively, in process block 98, the processor 30 may determine the apparent dielectric constant based on the apparent conductivity as discussed in more detail below.

For example, the apparent dielectric constants may be defined as follows:

$$E_{r,a,zz} = -\frac{\sigma_{a,zz}^{AT}}{\omega\varepsilon_0} \quad (91)$$

$$E_{r,a,xx} = -\frac{\sigma_{a,xx}^{AT}}{\omega\varepsilon_0} \quad (92)$$

The above two expressions are for a coaxial and coplanar elemental downhole tool, respectively, and are obtained using the second form of apparent conductivity for both tools. In a highly resistive formation (e.g., above a resistivity threshold, such as where $\omega\varepsilon_h \gg \sigma_h$ and/or $\omega\varepsilon_v \gg \sigma_v$) apparent dielectric constants given in Eqns. (91) and (92) may provide an estimate of horizontal and vertical dielectric constants, respectively.

A Multi-Array Propagation Tool with a Uniform Tool Constant

The tool constants given in Eqns. (31) and (56) for are a function of spacing and frequency. Therefore, the tool constants may be used for optimizing tool design. In one application, the tool constants for all arrays of a multi-array propagation tool consisting of multiple elemental arrays may be selected such that:

$$K_{\alpha\alpha}^j = -\frac{1}{2}(L_{j,2}^2 - L_{j,1}^2)\omega_j\mu = C, j = 1, \ldots, M, \quad (93)$$

where j is the index for the arrays, M is the total number of arrays, and C is a constant number. The subscript $\alpha$ of $K_{\alpha\alpha}^j$ is the orientation of the transmitter and receiver coils, $\alpha = x, z$. Such a selection ensures that the measurements from all arrays have the same skin effect. It should be noted that this property may be important when using the spread of logs from multiple arrays for a quick invasion evaluation.

Numerical Results

Figure 6:
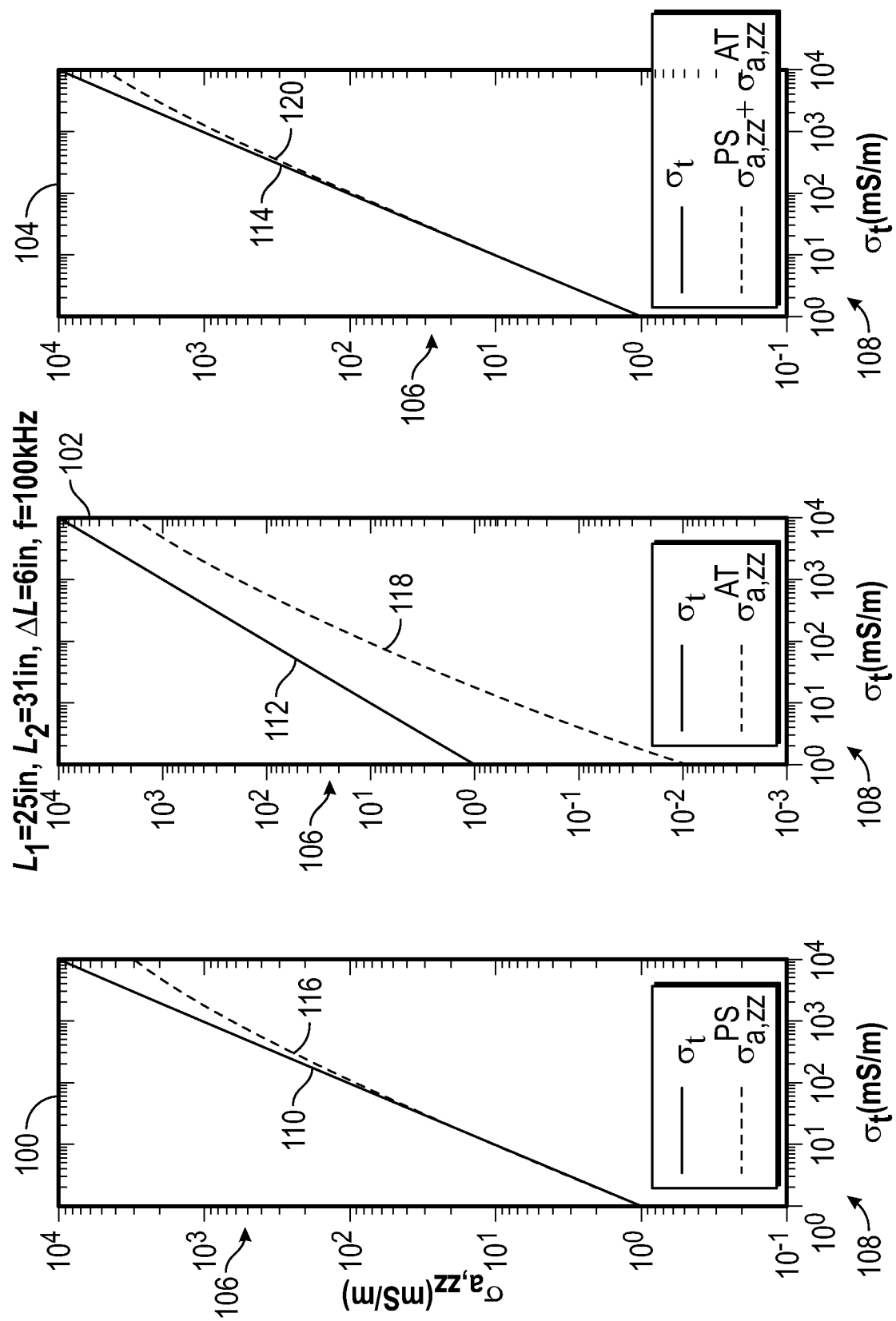
FIG. 6 shows three panels that each depict an apparent conductivity for a coaxial propagation well logging tool operating at 100 kHz, in accordance with aspects of the present disclosure.
Figure 7:
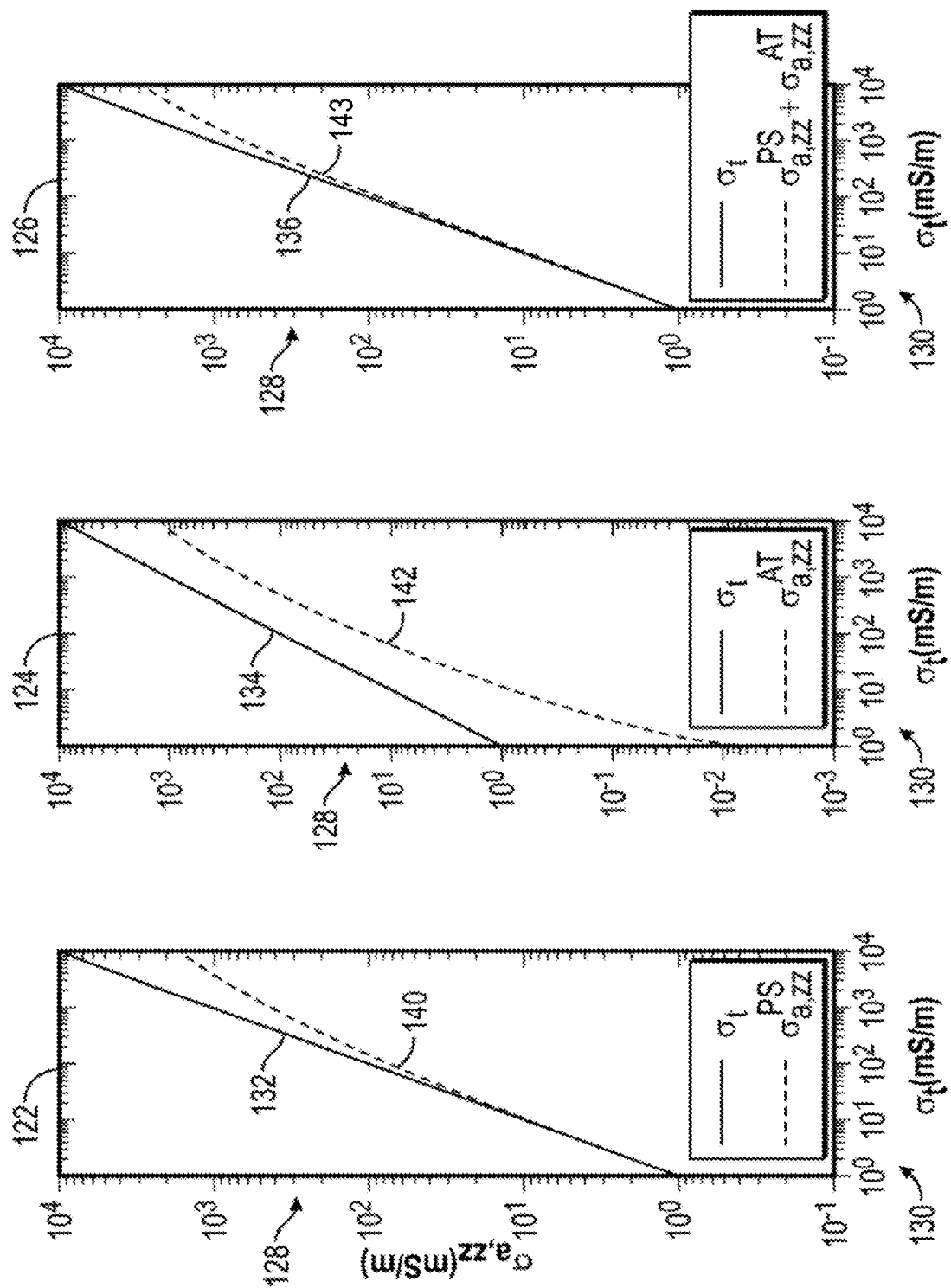
FIG. 7 shows three panels that each depict an apparent conductivity for a coaxial propagation well logging tool operating at 400 kHz, in accordance with aspects of the present disclosure.
Figure 8:
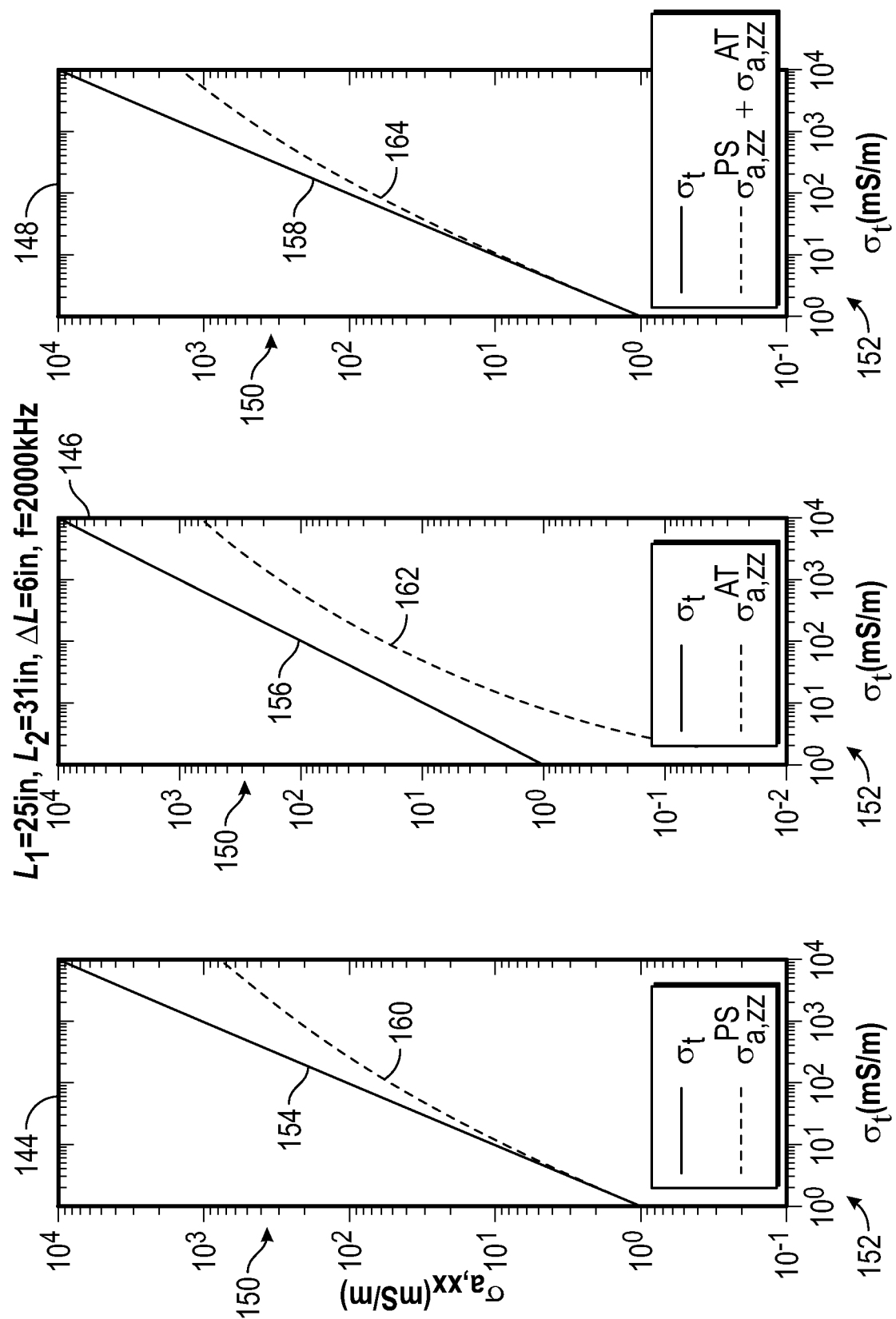
FIG. 8 shows three panels that each depict an apparent conductivity for a coaxial propagation well logging tool operating at 2000 kHz, in accordance with aspects of the present disclosure.

FIG. 6 shows three panels (e.g., panel 100, panel 102, and panel 104) that depict apparent conductivity (e.g., axis 106) versus true conductivity (e.g., axis 108) for a 28-in coaxial elemental propagation tool having two receivers where $L_1=25$ in., $L_2=31$ in., $\Delta L=6$ in., and an operating frequency of 100 kHz. The lines (e.g., line 110, line 112, and line 114) are related to the true conductivity, and the lines (e.g., line 116, line 118, and line 120) are related to the phase-shift apparent conductivity, the attenuation apparent conductivity, and the skin effect-corrected phase shift apparent conductivity, respectively. Here and in the following, the true conductivity of an isotropic formation is denoted by $\sigma_t$, $\sigma_t=\sigma_h=\sigma_v$. FIG. 7 shows three panels (e.g., panel 122, panel 124, and panel 126) that depict apparent conductivity (e.g., axis 128) versus true conductivity (e.g., axis 130) for a 28-in coaxial elemental propagation tool where $L_1=25$ in., $L_2=31$ in., $\Delta L=6$ in., and at an operating frequency of 400 kHz. The lines (e.g., line 132, line 134, and line 136) are related to the true conductivity and the lines (e.g., line 140, line 142, and line 143) are related to the phase-shift apparent conductivity, the attenuation apparent conductivity, and the skin effect-corrected phase shift apparent conductivity, respectively. FIG. 8 shows three panels (e.g., panel 144, panel 146, and panel 148) that depict apparent conductivity (e.g., axis 150) versus true conductivity (e.g., axis 152) for a 28-in coaxial elemental propagation tool where $L_1=25$ in., $L_2=31$ in., $\Delta L=6$ in., and at an operating frequency of 2000 kHz. The lines (e.g., line 154, line 156, and line 158) are related to the true conductivity and the lines (e.g., line 160, line 162, and line 164) are related to the phase-shift apparent conductivity, the attenuation apparent conductivity, and the skin effect-corrected phase shift apparent conductivity, respectively.

As shown in the graphs depicted in FIGS. 6-8, for a given frequency, the phase-shift apparent conductivity (e.g., corresponding to line 116, line 140, and line 160) approaches the true conductivity (e.g., corresponding to line 110, line 132, and line 154) for relatively small values of the true conductivity and deviate the true conductivity (e.g., corresponding to line 110, line 132, and line 154) for relatively large values of the true conductivity. Moreover, the attenuation apparent conductivity (e.g., corresponding to line 118, line 142, and line 162) approaches zero when the true conductivity (e.g., corresponding to line 112, line 134, and line 156) is relatively small and the attenuation apparent conductivity increases monotonically when the true conductivity increases. Further, the difference between the skin effect corrected phase shift apparent conductivity (e.g., corresponding to line 120, line 144, and line 164) and true conductivity (e.g., corresponding to line 114, line 136, and line 158) is smaller than for the phase-shift apparent conductivity (e.g., corresponding to line 116, line 140, and line 160).

Figure 9:
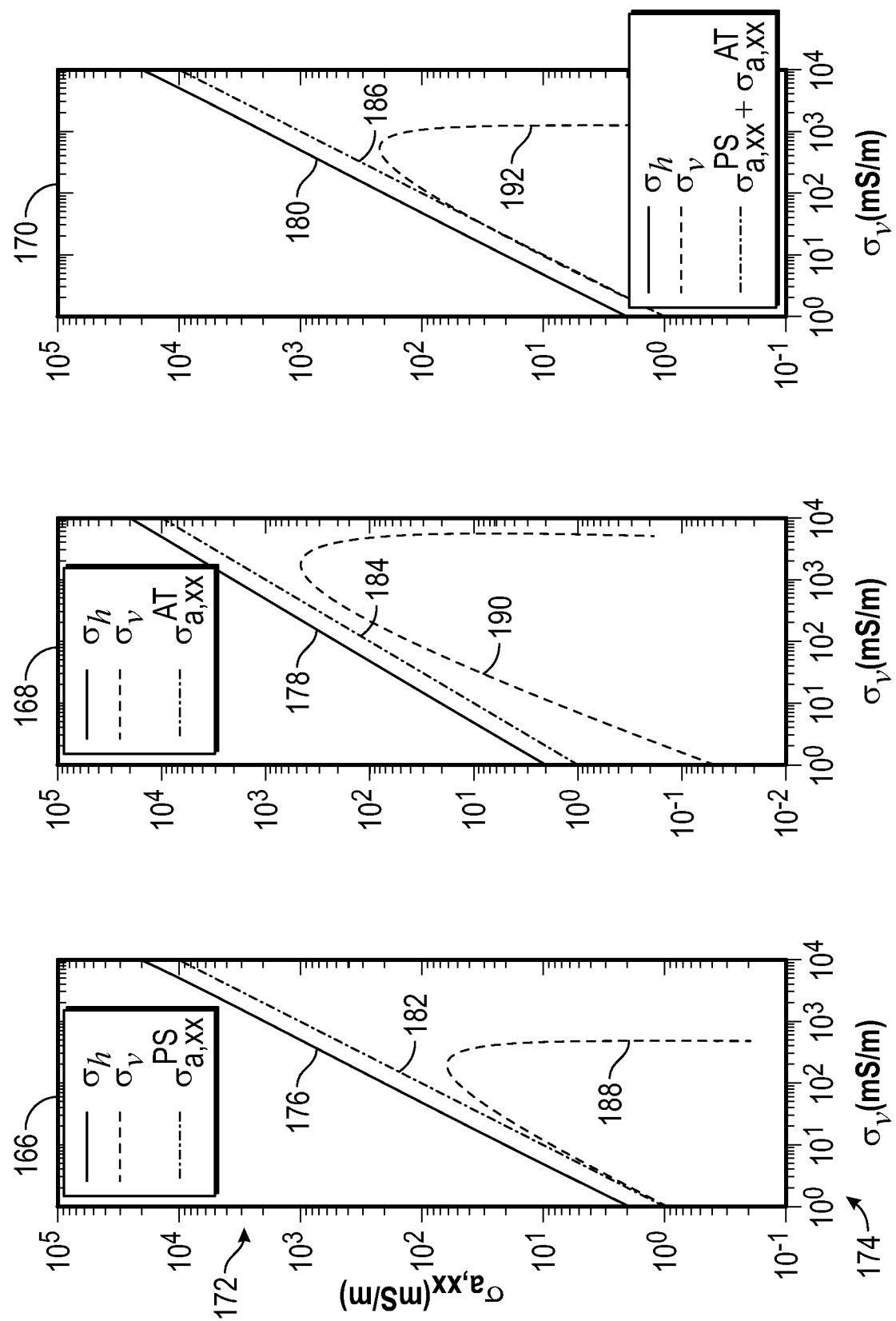
FIG. 9 shows three panels that each depict an apparent conductivity for a coplanar propagation well logging tool operating at 100 kHz, in accordance with aspects of the present disclosure.
Figure 10:
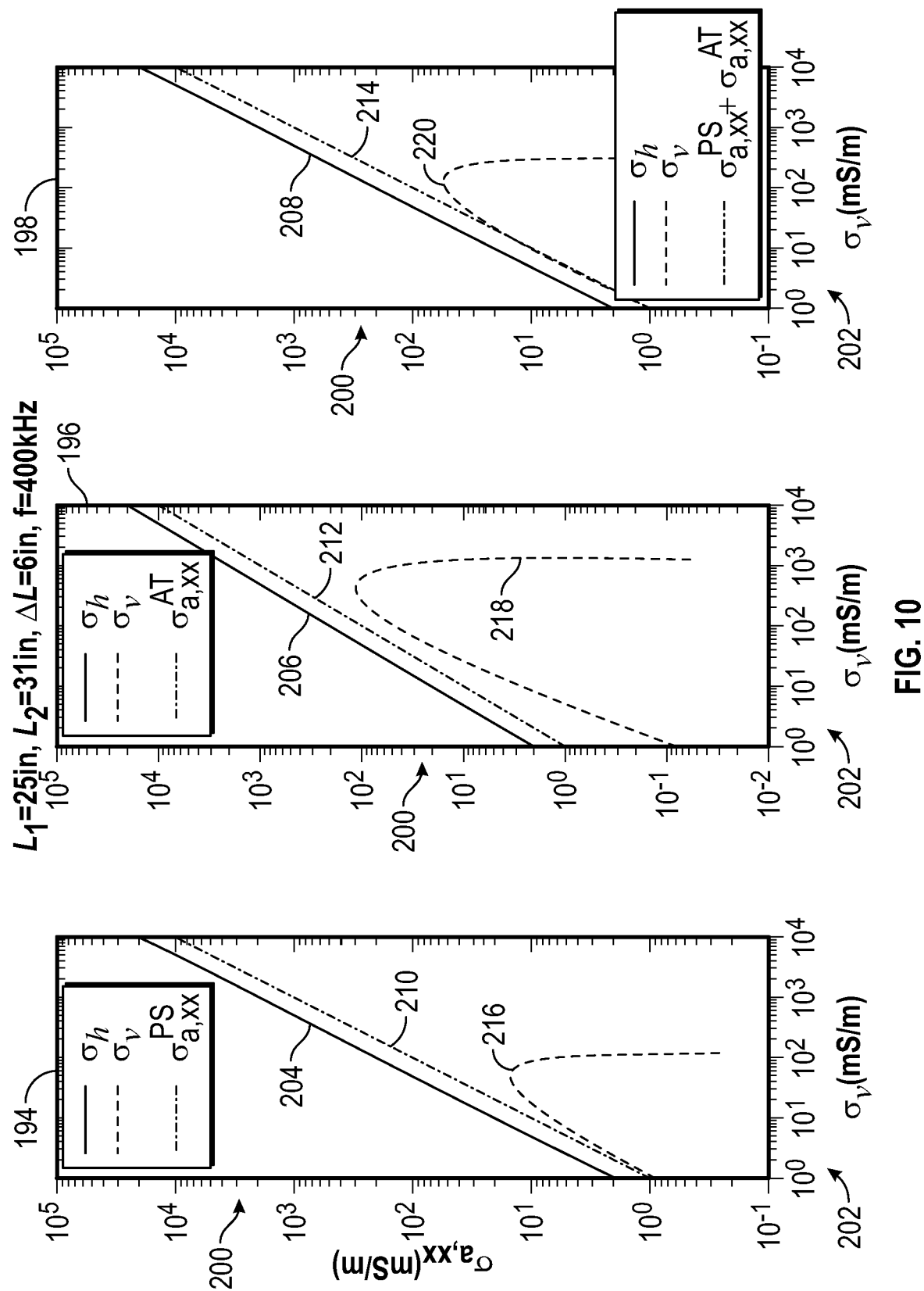
FIG. 10 shows three panels that each depict an apparent conductivity for a coplanar propagation well logging tool operating at 400 kHz, in accordance with aspects of the present disclosure.
Figure 11:
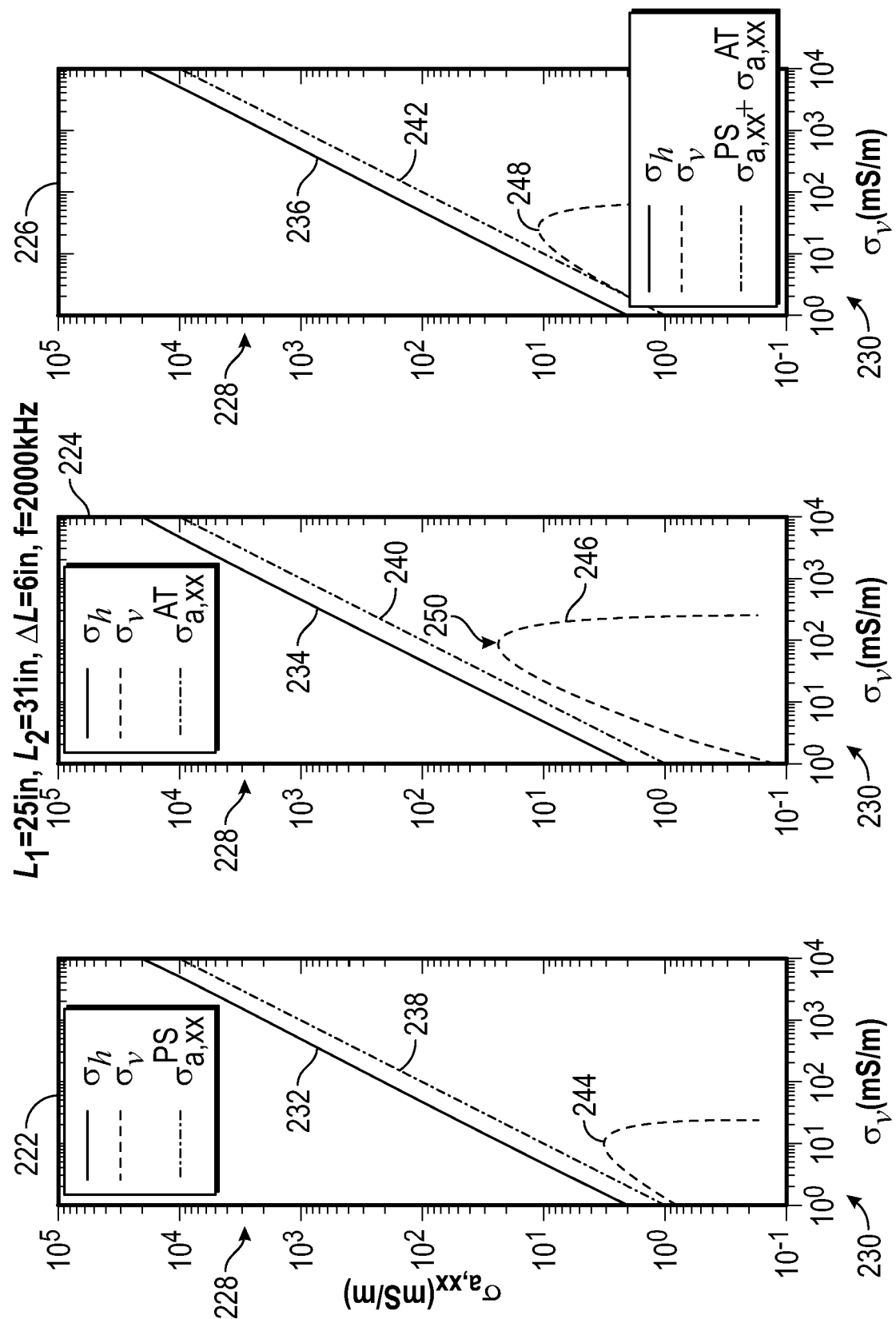
FIG. 11 shows three panels that each depict an apparent conductivity for a coplanar propagation well logging tool operating at 2000 kHz, in accordance with aspects of the present disclosure.

FIG. 9 shows three panels (e.g., panel 166, panel 168, and panel 170) that depict apparent conductivity (e.g., axis 172) versus vertical conductivity (e.g., axis 174) for a 28-in coplanar elemental propagation tool having two receivers where $L_1=25$ in., $L_2=31$ in., $\Delta L=6$ in., and an operating frequency of 100 kHz. The lines (e.g., line 176, line 178, and line 180) are related to the horizontal conductivity, the line 182, line 184, and line 186 are related to the vertical conductivity, and the line 188, line 190, and line 192 are related to the phase-shift apparent conductivity, the attenuation apparent conductivity, and the skin effect-corrected phase shift apparent conductivity, respectively. FIG. 10 shows three panels (e.g., panel 194, panel 196, and panel 198) that depict apparent conductivity (e.g., axis 200) versus vertical conductivity (e.g., axis 202) for a 28-in coplanar elemental propagation tool having two receivers where $L_1=25$ in., $L_2=31$ in., $\Delta L=6$ in., and an operating frequency of 400 kHz. The lines (e.g., line 204, line 206, and line 208) are related to the horizontal conductivity, the lines (e.g., line 210, line 212, and line 214) are related to the vertical conductivity, and the lines (e.g., line 216, line 218, and line 220) are related to the phase-shift apparent conductivity, the attenuation apparent conductivity, and the skin effect-corrected phase shift apparent conductivity, respectively. FIG. 11 shows three panels (e.g., panel 222, panel 224, and panel 226) that depict apparent conductivity (e.g., axis 228) versus vertical conductivity (e.g., axis 230) for a 28-in coplanar elemental propagation tool having two receivers where $L_1=25$ in., $L_2=31$ in., $\Delta L=6$ in., and an operating frequency of 2000 kHz. The lines (e.g., line 232, line 234, and line 236) are related to the horizontal conductivity, the lines (e.g., line 238, line 240, and line 242) are related to the vertical conductivity, and the lines (e.g., line 244, line 246, and line 248) are related to the phase-shift apparent conductivity, the attenuation apparent conductivity, and the skin effect-corrected phase shift apparent conductivity, respectively.

As shown in the graphs depicted in FIGS. 9-11, for a given frequency, the phase shift apparent conductivity (e.g., corresponding to line 188, line 216, and line 244) approach the true vertical conductivity (e.g., the vertical conductivity corresponding to line 182, line 210, and line 238) when the conductivity is relatively small and the phase shift apparent conductivity deviates gradually from the true conductivity when the conductivity is relatively large. However, the deviation increases more rapidly than that for the coaxial tool as shown in FIGS. 6-8. The attenuation apparent conductivity (e.g., corresponding to line 190, line 218, and line 246) approaches zero when the true vertical conductivity (e.g., the vertical conductivity corresponding to line 182, line 210, and line 238) is relatively small. When the true conductivity (e.g., the vertical conductivity corresponding to line 184, line 212, and line 240) increases, the attenuation apparent conductivity (e.g., corresponding to line 190, line 218, and line 246) increase monotonically and then deviate for relatively high values of conductivity. The threshold (e.g., at data point 250) for the rollover is shown in FIG. 11, and is inversely proportional to the operating frequency. The same tendency is true with the phase shift apparent conductivity (e.g., corresponding to line 188, line 216, and line 244). For example, the threshold for the apparent conductivity of line 188 of FIG. 9 is at a higher conductivity than the threshold for the apparent conductivity of line 216 of FIG. 10.

Figure 12:
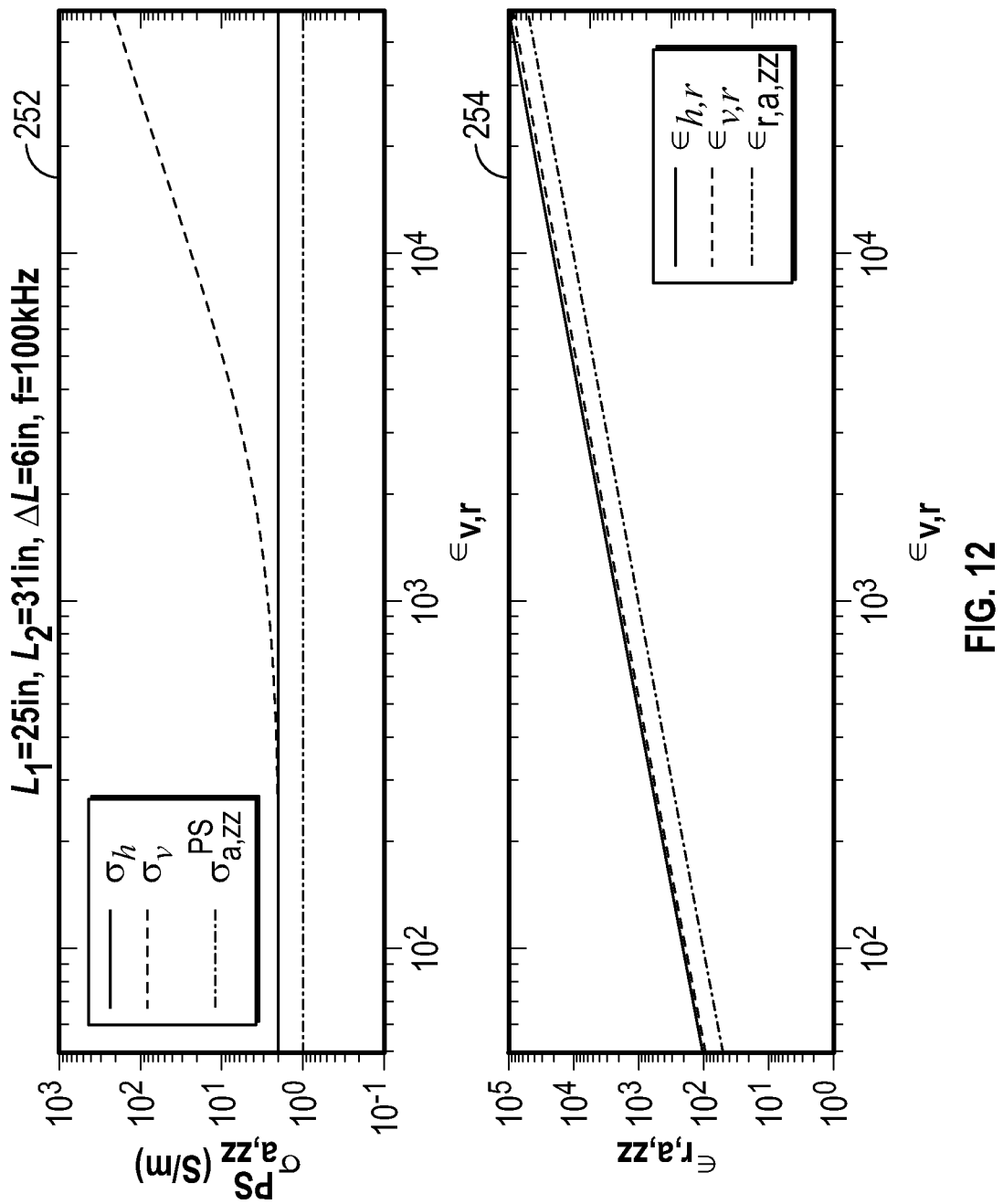
FIG. 12 shows two panels that depicts a phase shift apparent conductivity and an apparent dielectric constant determined based at least in part on an attenuation apparent conductivity for a coaxial propagation well logging tool operating at 100 kHz, in accordance with aspects of the present disclosure.
Figure 13:
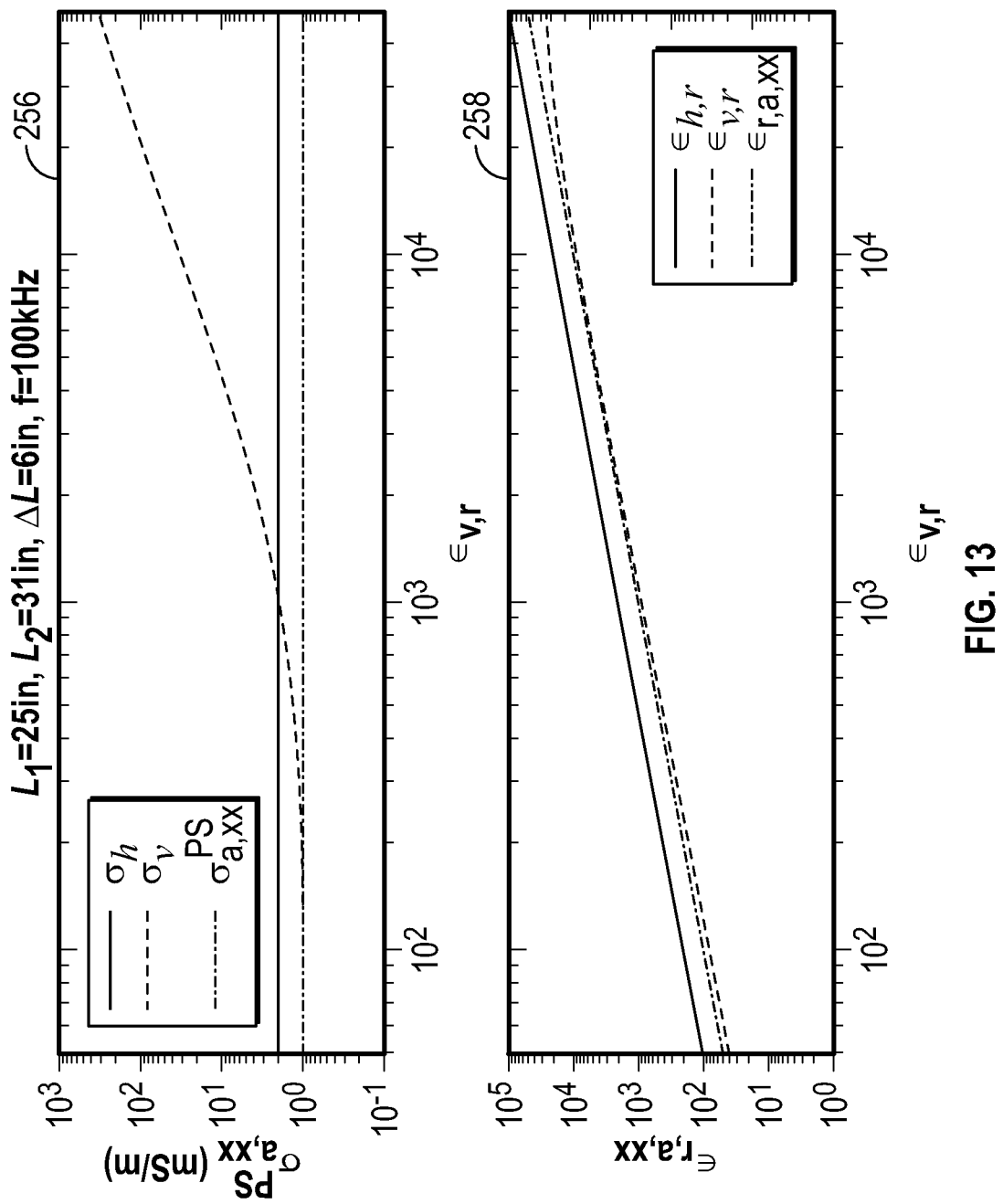
FIG. 13 shows two panels that depicts a phase shift apparent conductivity and an apparent dielectric constant determined based at least in part on an attenuation apparent conductivity for a coplanar propagation well logging tool operating at 100 kHz, in accordance with aspects of the present disclosure.

FIG. 12 shows two panels (e.g., panel 252 and panel 254) that depict a phase shift apparent conductivity and an apparent dielectric constant determined based at least in part on an attenuation apparent conductivity for a coaxial propagation well logging tool operating at 100 kHz. FIG. 13 shows two panels (e.g., panel 256 and panel 258) that depicts a phase shift apparent conductivity and an apparent dielectric constant determined based at least in part on an attenuation apparent conductivity for a coplanar propagation well logging tool operating at 100 kHz, in accordance with aspects of the present disclosure.

In particular, FIGS. 12 and 13 show apparent dielectric constants $\varepsilon_{r,a,zz}$ and $\varepsilon_{r,a,xx}$ for two elemental propagation tools in a homogeneous formation. Here, $\varepsilon_{r,a,zz}=-\sigma_{a,zz}^{AT}/\omega\varepsilon_0$, $\varepsilon_{r,a,xx}=-\sigma_{a,xx}^{AT}/\omega\varepsilon_0$. The frequency is set to 100 kHz in the simulation. The conductivities of the formation are fixed to $\sigma_h=2$ mS/m and $\sigma_v=1$ mS/m, respectively in the simulation. Results show that $\varepsilon_{r,a,zz} \approx \varepsilon_{h,r}$, $\varepsilon_{r,a,xx} \approx \varepsilon_{v,r}$ over the whole range of $\varepsilon_{h,r}$ and $\varepsilon_{v,r}$ as expected. Moreover, when $\varepsilon_{h,r}$ and $\varepsilon_{v,r}$ decreases, $\sigma_{a,zz}^{PS} \approx \sigma_h$ and $\sigma_{a,xx}^{PS} \approx \sigma_v$.

Figure 14:
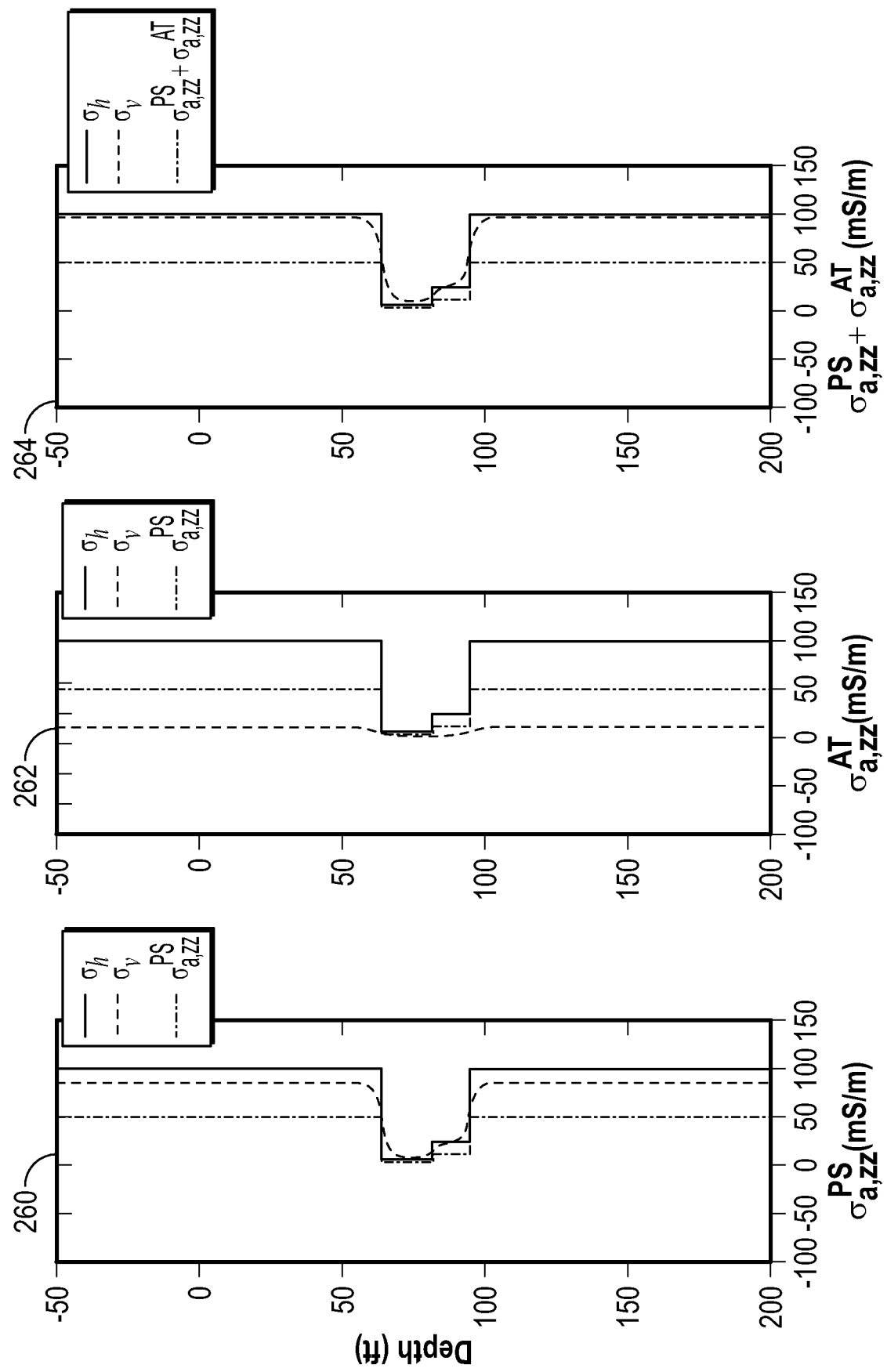
FIG. 14 shows three panels that each depict apparent conductivity well logs based at least in part on measurements acquired by a fully compensated coaxial propagation well logging tool operating at 100 kHz within a 4-layer formation, in accordance with aspects of the present disclosure.
Figure 15:
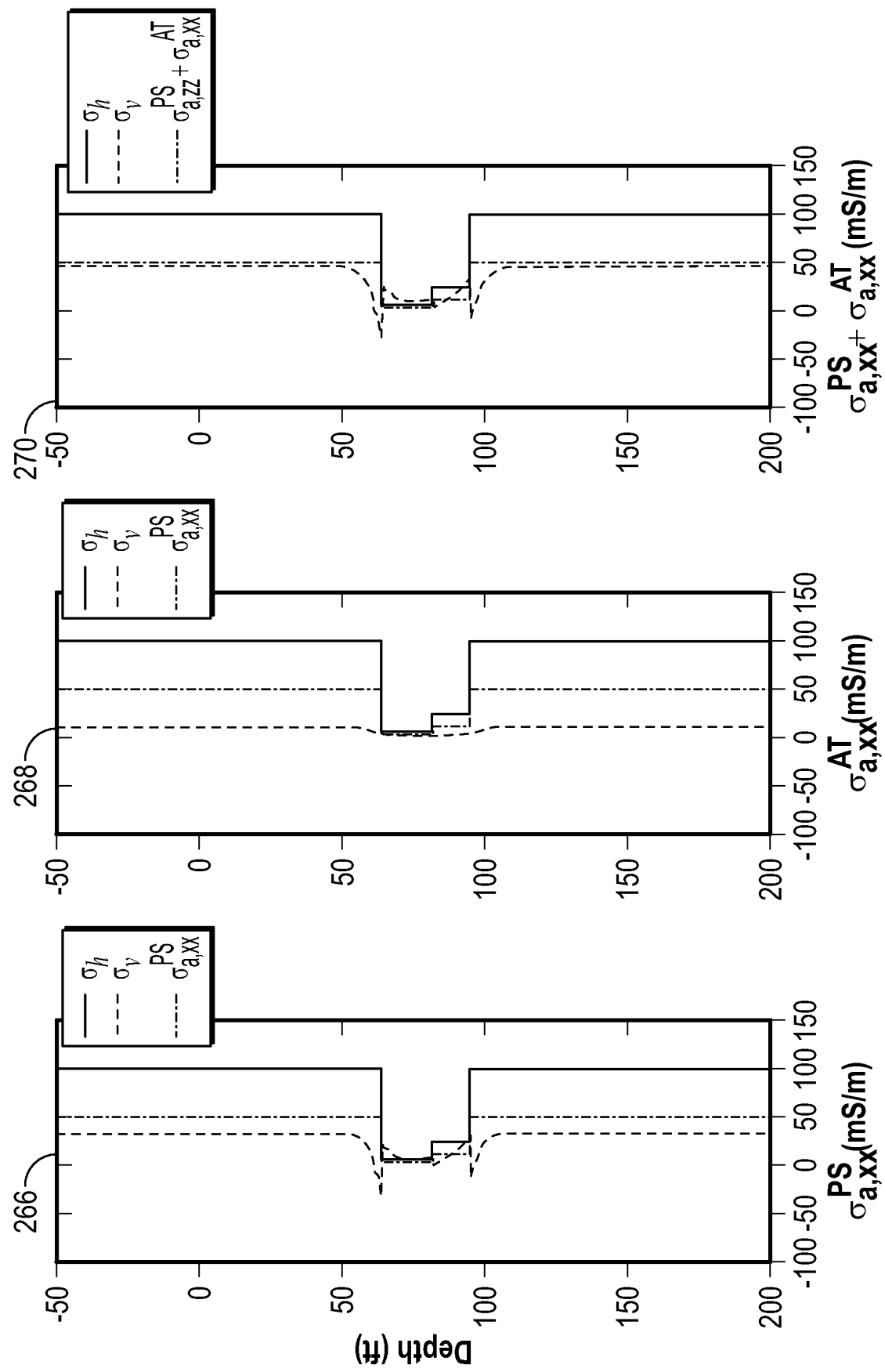
FIG. 15 shows three panels that each depict apparent conductivity well logs based at least in part on measurements acquired by a fully compensated coplanar propagation well logging tool operating at 100 kHz within a 4-layer formation, in accordance with aspects of the present disclosure.

FIG. 14 shows three panels (e.g., panel 260, panel 262, and panel 264) that each depict apparent conductivity well logs based at least in part on measurements acquired by a fully compensated coaxial propagation well logging tool operating at 100 kHz within a 4-layer formation. FIG. 15 shows three panels (e.g., panel 266, panel 268, and panel 270) that each depict apparent conductivity well logs based at least in part on measurements acquired by a fully compensated coplanar propagation well logging tool operating at 100 kHz within a 4-layer formation.

In particular, FIGS. 14 and 15 show apparent conductivities $\sigma_{a,zz}$ and $\sigma_{a,xx}$ of a fully compensated triaxial propagation tool in a 4-layer formation as identified by blue and green square logs. The triaxial tool is the same as CDR in terms of geometry. The operating frequency is 100 kHz. In this example, the triaxial propagation tool consists of two transmitters (T1 and T2) and two receivers (R1 and R2). T1 is placed below R1. T2 is above R2. The spacings between T1 and R1 and R2 are 25 in. and 31 in., respectively. The spacings between T2 and R1 and R2 are 31 in. and 25 in., respectively. For the coaxial measurement, the phase shift apparent conductivity curve $\sigma_{a,zz}^{PS}$ follows $\sigma_h$ closely. The attenuation apparent conductivity $\sigma_{a,zz}^{AT}$ varies slowly with depth as a result of large depth of investigation. It should be noted that, the skin effect-corrected phase shift apparent conductivity curve, namely $\sigma_{a,zz}^{PS}+\sigma_{a,zz}^{AT}$ is closer to $\sigma_h$ than $\sigma_{a,zz}^{PS}$ without skin effect correction. For the coplanar measurements, results show that the phase shift apparent conductivity curve $\sigma_{a,xx}^{PS}$ appears to follow $\sigma_v$ more closely than $\sigma_h$. After the skin effect correction, the phase shift apparent conductivity curve, namely $\sigma_{a,xx}^{PS}+\sigma_{a,xx}^{AT}$ is closer to $\sigma_v$. It should be noted that there are spikes occurring on the $\sigma_{a,xx}^{PS}$ curve as a result of induced current crossing bed boundaries. As far as the root cause is concerned, this phenomenon is the same as polarization horns that have been observed on coplanar couplings of a triaxial induction tool, or responses of coaxial array induction and propagation tools at high relative dip. In the simulation, it is assumed that the tool axis is perpendicular to the bedding planes. The dielectric constants of the model are given following the empirical relationship for ARC tool.

Figure 16:
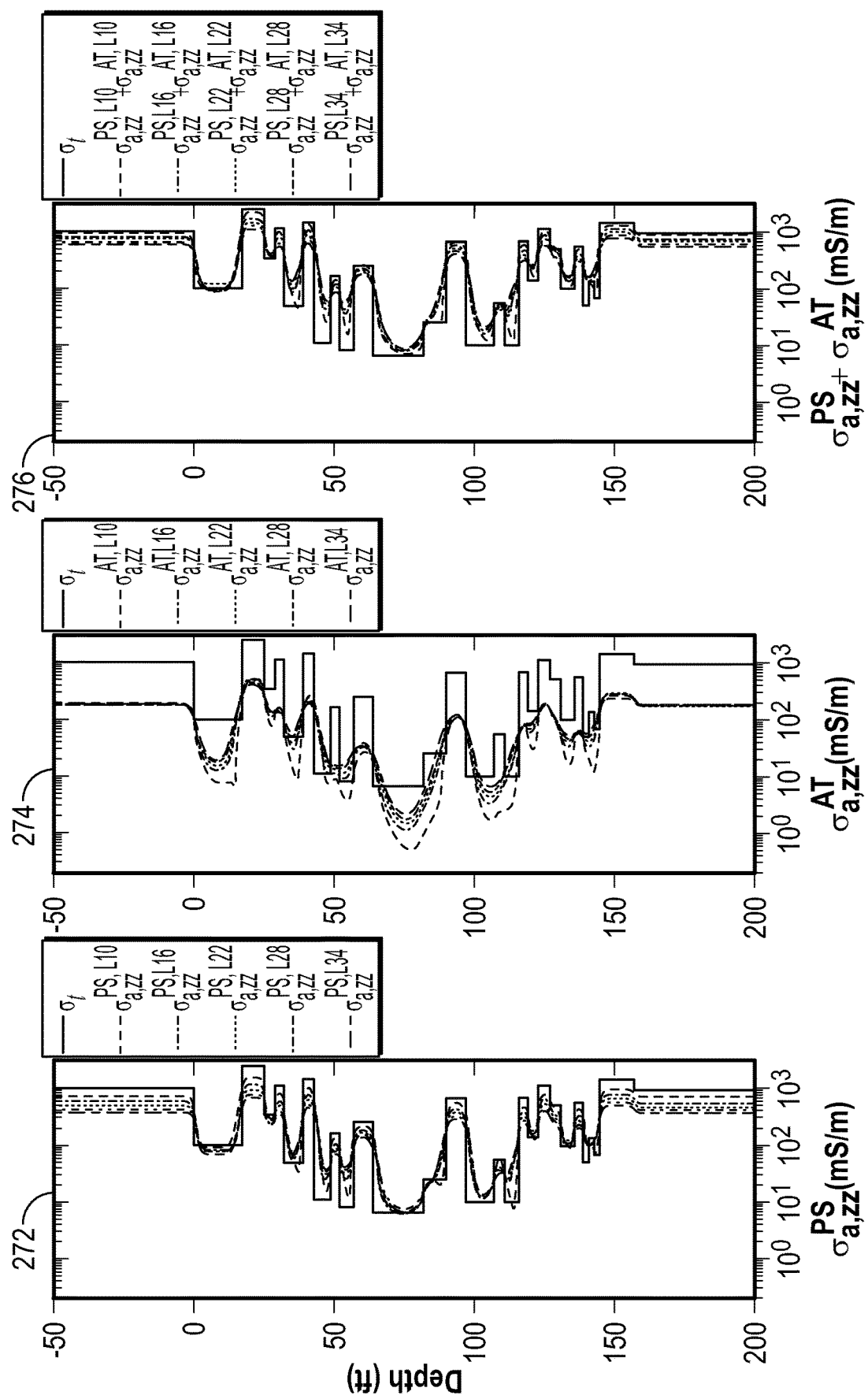
FIG. 16 shows three panels that each depict apparent conductivity well logs based at least in part on measurements acquired by an array resistivity compensated propagation well logging tool operating at 400 kHz within a multi-layer formation (e.g., having greater than 4 layers), in accordance with aspects of the present disclosure.
Figure 17:
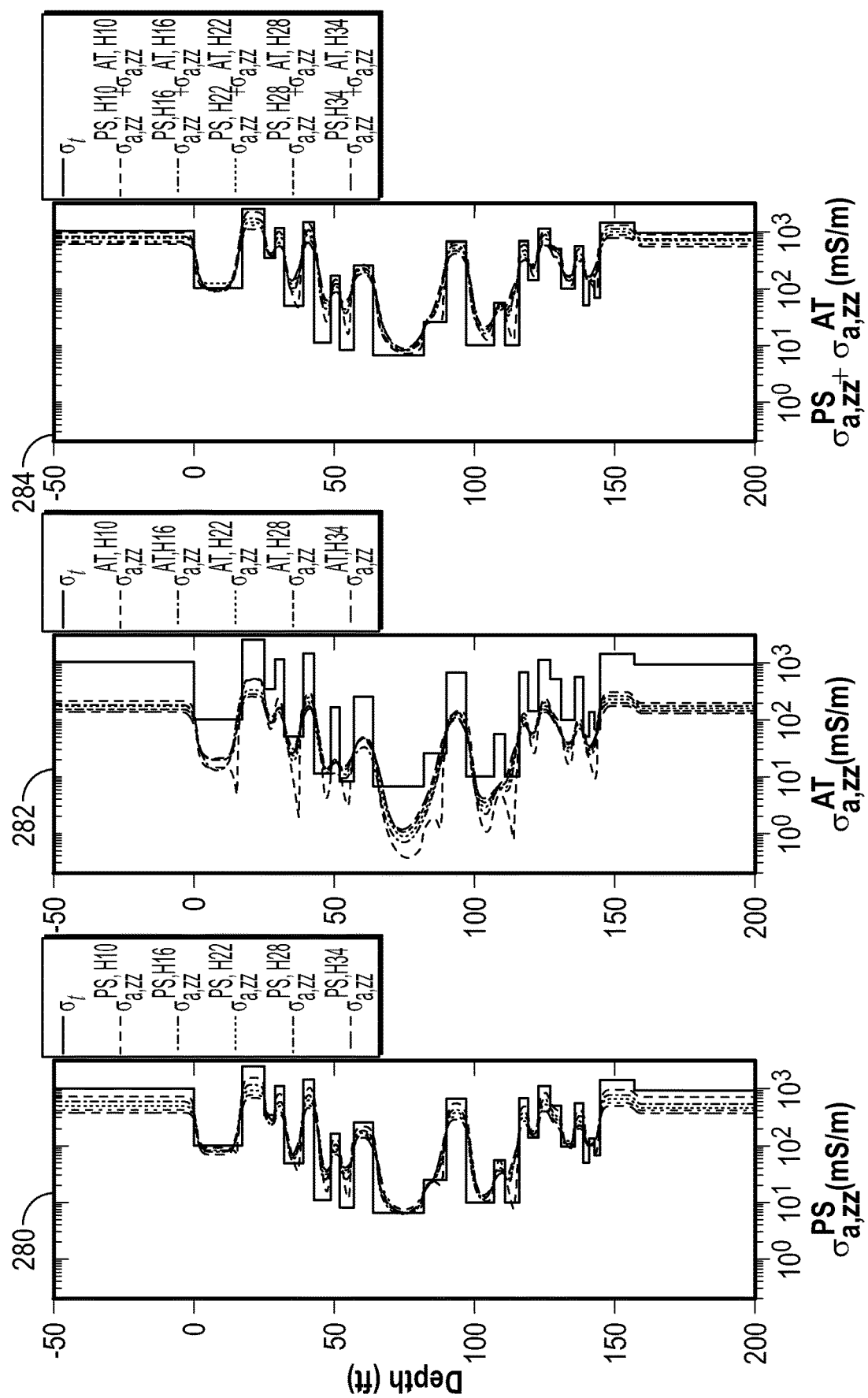
FIG. 17 shows three panels that each depict apparent conductivity well logs based at least in part on measurements acquired by an array resistivity compensated propagation well logging tool operating at 2 MHz within a multi-layer formation (e.g., having greater than 4 layers), in accordance with aspects of the present disclosure.

FIG. 16 shows three panels (e.g., panel 272, panel 274, and panel 278) that each depict apparent conductivity well logs based at least in part on measurements acquired by an array resistivity compensated propagation well logging tool operating at 400 kHz within a multi-layer formation (e.g., having greater than 4 layers), in accordance with aspects of the present disclosure. FIG. 17 shows three panels (e.g., panel 280, panel 282, and panel 284) that each depict apparent conductivity well logs based at least in part on measurements acquired by an array resistivity compensated propagation well logging tool operating at 2 MHz within a multi-layer formation (e.g., having greater than 4 layers), in accordance with aspects of the present disclosure.

More specifically, FIGS. 16 and 17 show apparent conductivity $\sigma_{a,zz}$ of ARC5 (e.g., an array resistivity compensated (ARC) well logging tool by Schlumberger) 400 kHz and 2 MHz, respectively in a multilayer formation identified by the dark green square log. Shown in the left track (e.g., panels 272 and 280) is phase shift apparent conductivity $\sigma_{a,zz}^{PS}$, and in the middle track (e.g., panels 274 and 282) is attenuation apparent conductivity $\sigma_{a,zz}^{AT}$. The skin effect-corrected phase shift apparent conductivity curve, namely $\sigma_{a,zz}^{PS}+\sigma_{a,zz}^{AT}$ is displayed in the right track (e.g., panels 278 and 284). For a given frequency, the shallow arrays follow more closely the true formation conductivity because of small shoulder bed effect and mild skin effect. $\sigma_{a,zz}^{PS}$ is apparently a better measure of true formation conductivity than $\sigma_{a,zz}^{AT}$. After the skin effect correction, the phase shift apparent conductivity curves, namely those identified by $\sigma_{a,zz}^{PS}+\sigma_{a,zz}^{AT}$ in the right track (e.g., panels 278 and 284) are closer to the true formation conductivity. Moreover, the spread of the five curves is smaller than those in the left track (e.g., panels 272 and 280). Between two frequencies, the logs at 2 MHz exhibit stronger skin effect than their counterparts at 400 kHz. In the simulation, it is assumed that the tool axis is perpendicular to the bedding planes. The dielectric constants of the model are given following the empirical relationship for ARC well logging tool.

Figure 18:
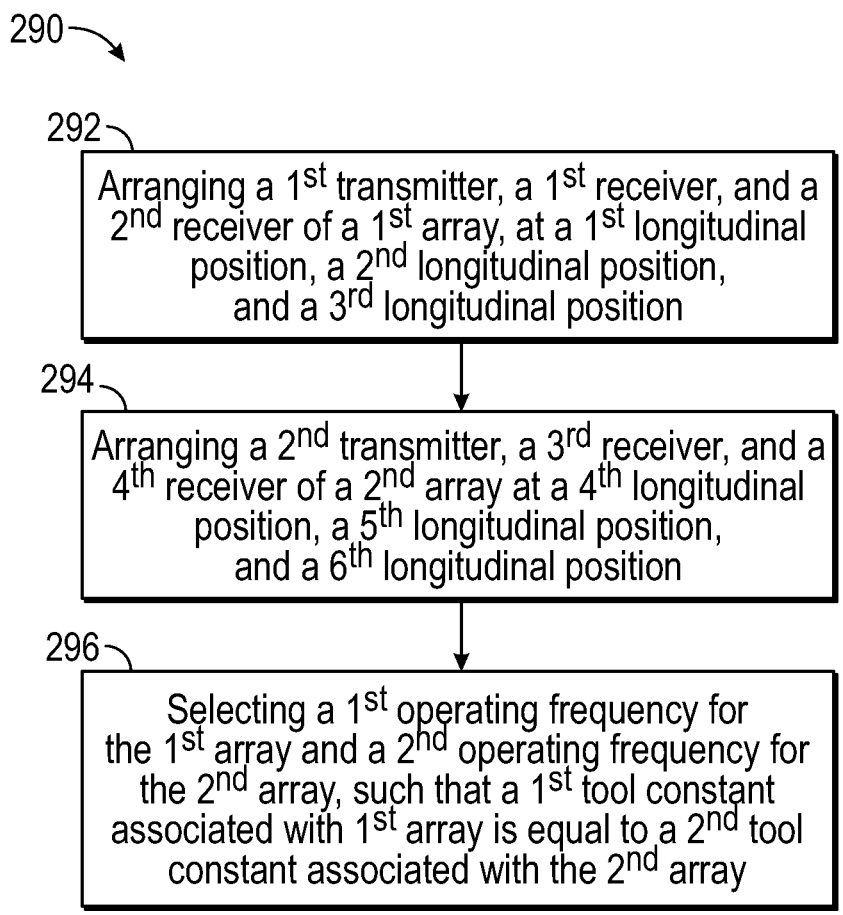
FIG. 18 shows a flow chart representing an embodiment of a method of manufacturing a multi-array propagation well logging tool, in accordance with aspects of the present disclosure.

As mentioned above, the techniques of the present disclosure may be used for designing a multi-array propagation well-logging tool having a uniform tool constant. FIG. 18 is a flow diagram of a method of manufacture 290 for building a multi-array propagation well logging tool with a uniform tool constant for at least a portion of the arrays (e.g., a combination of a transmitter and two receivers in different longitudinal positions). The method of manufacture 290 includes arranging a first transmitter of a first array in a first longitudinal position, a first receiver of the first array in a second longitudinal position, and a second receiver of the first array in a third longitudinal position (block 292). The method of manufacture 290 also includes arranging a second transmitter of a second array in a fourth longitudinal position, a third receiver of the second array in a fifth longitudinal position, and a fourth receiver in a sixth longitudinal position (block 294). The method of manufacture 290 also includes selecting a first operating frequency of the first array and a second operating frequency of the second array such that a first tool constant for the first array is approximately equal to a second tool constant for the second array (block 296). At least in some embodiments, the first tool constant and/or the second tool constant may be modified based on the longitudinal positions of the transmitter(s) and receiver(s) such that a predetermined resolution and/or depth of investigation may be achieved.

Accordingly, the present disclosure relates to techniques for processing propagation well logging measurements to generate an apparent conductivity and/or apparent resistivity based at least in part on the propagation well logging measurements without using an inversion or a resistivity transform. In particular, the disclosed techniques for processing the propagation well logging measurements may utilize a tool constant that is based on a relative longitudinal position of at least two of the receivers of the propagation well logging tool. Using the disclosed tool constant, apparent conductivity and/or apparent resistivity may be computed, which may be used to generate apparent conductivity and/or apparent resistivity well logs. In some embodiments, the apparent conductivity may be a phase shift apparent conductivity and/or an attenuation apparent conductivity. As discussed herein, the phase shift apparent conductivity may provide a measure of formation conductivity and the attenuation apparent conductivity may provide a measure of the skin effect. In some embodiments, the phase shift apparent conductivity may be corrected for the skin effect using the attenuation apparent conductivity to generate an improved apparent conductivity that may be representative of the true formation conductivity.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
acquiring, via a processor, propagation measurements in a wellbore through a geological formation using one or more propagation well logging tools having at least two receivers;
converting, via the processor, the propagation measurements to an apparent conductivity without inverting the propagation measurements, the converting based at least in part on:
an operating frequency associated with the propagation measurements;
a relative longitudinal position of the at least two receivers; and
a phase shift measurement, an attenuation measurement, or both the phase shift measurement and the attenuation measurement, associated with the propagation measurements; and
generating, via the processor, a well log based at least in part on the apparent conductivity.

2. The method of claim 1, wherein converting the propagation measurements to the apparent conductivity without inverting the propagation measurements is based at least in part on a first ratio between the phase shift measurement and the relative longitudinal position of the at least two receivers, a second ratio between the attenuation measurement and the relative longitudinal position of the at least two receivers, or both.

3. The method of claim 1, comprising determining a skin effect corrected apparent conductivity based at least in part on the apparent conductivity, and wherein the skin effect corrected apparent conductivity is determined by:
converting, via the processor, the phase shift measurement to a phase shift apparent conductivity using the relative longitudinal position of the at least two receivers;
converting, via the processor, the attenuation measurement to an attenuation apparent conductivity; and
correcting, via the processor, the phase shift apparent conductivity using the attenuation apparent conductivity to generate the skin effect corrected apparent conductivity.

4. The method of claim 1, comprising correcting, via the processor, the propagation measurements based on an error calibration based on an additional propagation measurement made at a surface above the geological formation to account for geometry of the one or more propagation well logging tools.

5. The method of claim 1, comprising determining, via the processor, an apparent dielectric constant based at least in part on the apparent conductivity, wherein the apparent conductivity comprises an attenuation apparent conductivity, and wherein the propagation measurements comprise an attenuation measurement.

6. The method of claim 1, wherein the relative longitudinal position of the at least two receivers is based at least in part on a first distance between a first receiver of the at least two receivers and a transmitter of the one or more propagation well logging tools and a second distance between a second receiver of the at least two receivers and the transmitter.

7. The method of claim 1, further comprising:
transforming data from the well log into one or more visual representations.

8. An article of manufacture comprising tangible, non-transitory, machine-readable media comprising instructions that, when executed by a processor, cause the processor to:
receive propagation measurements acquired in a wellbore through a geological formation using one or more propagation well logging tools having at least two receivers;
convert the propagation measurements to an apparent conductivity without inverting the propagation measurements, the converting based at least in part on:
an operating frequency associated with the propagation measurements;
a relative longitudinal position of the at least two receivers;
an attenuation measurement associated with the propagation measurements; and
a formation model;
convert the apparent conductivity to an apparent dielectric constant based at least in part on:
the attenuation measurement;
the operating frequency associated with the propagation measurements; and
a resistivity associated with the geological formation; and
generating a well log based at least in part on the apparent conductivity.

9. The article of manufacture of claim 8, wherein the instructions cause the processor to:
convert the apparent conductivity to the apparent dielectric constant when the resistivity associated with the geological formation is above a resistivity threshold.

10. The article of manufacture of claim 8, wherein the relative longitudinal position of the at least two receivers is based at least in part on a first distance between a first receiver of the at least two receivers and a transmitter of the one or more propagation well logging tools and a second distance between a second receiver of the at least two receivers and the transmitter.

11. The article of manufacture of claim 8, comprising determining a skin effect corrected apparent conductivity based at least in part on the apparent conductivity, wherein the propagation measurements are associated with a phase shift measurement, and wherein the skin effect corrected apparent conductivity is determined by:
converting the phase shift measurement to a phase shift apparent conductivity;
converting the attenuation measurement to an attenuation apparent conductivity; and
correcting the phase shift apparent conductivity using the attenuation apparent conductivity to generate the skin effect corrected apparent conductivity.

12. The article of manufacture of claim 8, wherein the instructions cause the processor to:
convert the propagation measurements to the apparent conductivity based at least in part on a tool constant, wherein the tool constant is based at least in part on the relative longitudinal position of the at least two receivers.

13. The article of manufacture of claim 8, wherein the instructions cause the processor to:
receive an error calibration based at least in part on an additional one or more propagation measurements made at a surface above the geological formation to account for geometry of the one or more propagation well logging tools; and correct the propagation measurements using the error calibration.

14. A system comprising:

one or more multi-array propagation well logging tools configured to acquire propagation measurements from a geological formation, wherein the one or more multi-array propagation well logging tools each comprise a plurality of arrays, wherein a first array of the plurality of arrays comprises a first transmitter disposed at a first longitudinal position, a first receiver disposed at a second longitudinal position, and a second receiver disposed at a third longitudinal position; and a data processing system configured to receive the propagation measurements and perform operations stored on an accessible non-transitory, machine-readable medium, the operations comprising:

receiving the propagation measurements associated with a wellbore through a geological formation obtained by one or more propagation well logging tools having at least two receivers;

converting the propagation measurements to an apparent conductivity using a first tool constant, wherein the first tool constant is based at least in part on:

an operating frequency of the first array;

the second longitudinal position of the first receiver and the third longitudinal position of the second receiver relative to the first longitudinal position of the first transmitter; and an attenuation measurement associated with the propagation measurements, a phase shift measurement associated with the propagation measurements, or both the attenuation measurement and the phase shift measurement associated with the propagation measurements, wherein the propagation measurements are converted without inverting the propagation measurements; and generating a well log based at least in part on the apparent conductivity.

15. The system of claim 14, wherein a second array of the plurality of arrays comprises a second transmitter disposed at a fourth longitudinal position, a third receiver disposed at a fifth longitudinal position, and a fourth receiver disposed at a sixth longitudinal position; and wherein the operations comprise:

converting the propagation measurements based at least in part on the first tool constant and a second tool constant, wherein the second tool constant is based at least in part on an additional operating frequency of the second array, the fifth longitudinal position of the third receiver and the sixth longitudinal position of the fourth receiver relative to the fourth longitudinal position of the second transmitter.

16. The system of claim 15, wherein the first tool constant is approximately equal to the second tool constant.

17. The system of claim 14, wherein the operations comprise:

receiving an error calibration based on an additional one or more propagation measurements made at a surface above the geological formation to account for geometry of the one or more propagation well logging tools; and correcting the propagation measurements based on the error calibration.

18. The system of claim 14, wherein the one or more propagation well logging tools comprise coplanar receivers, coaxial receivers, or both relative to a longitudinal tool axis.

* * * * *